US012638675B2

(12) United States Patent 
Singh et al.

(10) Patent No.: US 12,638,675 B2 
(45) Date of Patent: **\*May 26, 2026**

(54) PAIRING WITH COMPANION DEVICE

(71) Applicant: Magic Leap, Inc., Plantation, FL (US)

(72) Inventors: Nitin Singh, Fremont, CA (US); 
Adrian Kaehler, Los Angeles, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/819,573

(22) Filed: Aug. 29, 2024

(65) Prior Publication Data 
US 2024/0418990 A1      Dec. 19, 2024

Related U.S. Application Data

(63) Continuation of application No. 18/493,113, filed on Oct. 24, 2023, now Pat. No. 12,105,282, which is a 
(Continued)

(51) Int. Cl. 
*H04L 29/06*          (2006.01) 
*G02B 27/00*          (2006.01) 
(Continued)

(52) U.S. Cl. 
CPC ....... *G02B 27/0093* (2013.01); *G02B 27/017* 
(2013.01); *G06F 21/32* (2013.01); 
(Continued)

(58) Field of Classification Search 
CPC ... G02B 27/0093; G02B 27/017; G06F 21/32; 
G06F 21/44; G06V 20/80; 
(Continued)

(56) References Cited

U.S. PATENT DOCUMENTS

| | | | |
|---|---|---|---|
| 6,046,712 A | 4/2000 | Beller et al. | |
| 6,850,221 B1 | 2/2005 | Tickle | |

(Continued)

FOREIGN PATENT DOCUMENTS

| | | | |
|---|---|---|---|
| CN | 104254373 A | 12/2014 | |
| CN | 106973166 A * | 7/2017 | ........ H04M 1/72409 |

(Continued)

OTHER PUBLICATIONS

ARToolKit: https://web.archive.org/web/20051013062315/http://www.hitl.washington.edu:80/artoolkit/documentation/hardware.htm, archived Oct. 13, 2005.

(Continued)

*Primary Examiner* — Shawnchoy Rahman 
(74) *Attorney, Agent, or Firm* — Tobias Intellectual Property Law, PLLC

(57) ABSTRACT

This disclosure describes techniques for device authentication and/or pairing. A display system can comprise a head mountable display, computer memory, and processor(s). In response to receiving a request to authenticate a connection between the display system and a companion device (e.g., controller or other computer device), first data may be determined, the first data based at least partly on biometric data associated with a user. The first data may be sent to an authentication device configured to compare the first data to second data received from the companion device, the second data based at least partly on the biometric data. Based at least partly on a correspondence between the first and second data, the authentication device can send a confirmation to the display system to permit communication between the display system and companion device.

20 Claims, 14 Drawing Sheets

Related U.S. Application Data continuation of application No. 17/179,110, filed on Feb. 18, 2021, now Pat. No. 11,835,717, which is a continuation of application No. 15/982,844, filed on May 17, 2018, now Pat. No. 10,955,662.

(60) Provisional application No. 62/509,427, filed on May 22, 2017.

(51) Int. Cl.

| | |
|---|---|
| *G02B 27/01* | (2006.01) |
| *G06F 21/32* | (2013.01) |
| *G06F 21/44* | (2013.01) |
| *G06V 20/80* | (2022.01) |
| *H04L 9/40* | (2022.01) |
| *H04M 1/60* | (2006.01) |
| *H04W 4/80* | (2018.01) |
| *H04W 8/00* | (2009.01) |
| *H04W 12/065* | (2021.01) |
| *H04W 12/069* | (2021.01) |
| *H04W 12/50* | (2021.01) |
| *H04W 12/77* | (2021.01) |
| *F21V 8/00* | (2006.01) |
| *G02B 6/34* | (2006.01) |
| *H04B 1/3827* | (2015.01) |

(52) U.S. Cl.
CPC .............. *G06F 21/44* (2013.01); *G06V 20/80* (2022.01); *H04L 63/0861* (2013.01); *H04L 63/18* (2013.01); *H04M 1/6066* (2013.01); *H04W 4/80* (2018.02); *H04W 8/005* (2013.01); *H04W 12/065* (2021.01); *H04W 12/069* (2021.01); *H04W 12/50* (2021.01); *H04W 12/77* (2021.01); *G02B 6/0016* (2013.01); *G02B 6/34* (2013.01); *G02B 2027/0125* (2013.01); *G02B 2027/0127* (2013.01); *G02B 2027/0138* (2013.01); *G02B 2027/014* (2013.01); *G02B 2027/0178* (2013.01); *G02B 2027/0181* (2013.01); *H04B 2001/3866* (2013.01)

(58) Field of Classification Search
CPC ... H04L 63/0861; H04M 1/6066; H04W 4/80; H04W 12/065; H04W 12/50
See application file for complete search history.

(56) References Cited

U.S. PATENT DOCUMENTS

| | | | |
|---|---|---|---|
| D514,570 | S | 2/2006 | Ohta |
| 9,081,426 | B2 | 7/2015 | Armstrong |
| 9,215,293 | B2 | 12/2015 | Miller |
| D752,529 | S | 3/2016 | Loretan et al. |
| 9,325,828 | B1 | 4/2016 | Oh et al. |
| 9,348,143 | B2 | 5/2016 | Gao et al. |
| D759,657 | S | 6/2016 | Kujawski et al. |
| 9,417,452 | B2 | 8/2016 | Schowengerdt et al. |
| 9,470,906 | B2 | 10/2016 | Kaji et al. |
| 9,547,174 | B2 | 1/2017 | Gao et al. |
| 9,622,180 | B1 | 4/2017 | Yeung et al. |
| 9,671,566 | B2 | 6/2017 | Abovitz et al. |
| D794,288 | S | 8/2017 | Beers et al. |
| 9,740,006 | B2 | 8/2017 | Gao |
| 9,791,700 | B2 | 10/2017 | Schowengerdt |
| D805,734 | S | 12/2017 | Fisher et al. |
| 9,851,563 | B2 | 12/2017 | Gao et al. |
| 9,857,591 | B2 | 1/2018 | Welch et al. |
| 9,874,749 | B2 | 1/2018 | Bradski et al. |
| 10,425,392 | B2 | 9/2019 | Tal et al. |
| 10,425,813 | B2 | 9/2019 | Nakagawa et al. |
| 10,955,662 | B2 | 3/2021 | Singh et al. |

| | | | | |
|---|---|---|---|---|
| 11,835,717 | B2 | 12/2023 | Singh et al. | |
| 12,105,282 | B2 | 10/2024 | Singh et al. | |
| 2006/0028436 | A1 | 2/2006 | Armstrong | |
| 2007/0081123 | A1 | 4/2007 | Lewis | |
| 2008/0303665 | A1* | 12/2008 | Naik .................... | A61J 7/0481 |
| | | | | 340/568.1 |
| 2009/0088076 | A1 | 4/2009 | Mercurio et al. | |
| 2010/0183246 | A1 | 7/2010 | King et al. | |
| 2011/0140841 | A1* | 6/2011 | Bona ............... | G06K 19/06196 |
| | | | | 340/5.83 |
| 2011/0249122 | A1 | 10/2011 | Tricoukes et al. | |
| 2012/0127062 | A1 | 5/2012 | Bar-Zeev et al. | |
| 2012/0162549 | A1 | 6/2012 | Gao et al. | |
| 2012/0206452 | A1 | 8/2012 | Geisner et al. | |
| 2013/0082922 | A1 | 4/2013 | Miller | |
| 2013/0095924 | A1 | 4/2013 | Geisner et al. | |
| 2013/0117377 | A1 | 5/2013 | Miller | |
| 2013/0125027 | A1 | 5/2013 | Abovitz | |
| 2013/0208234 | A1 | 8/2013 | Lewis | |
| 2013/0242262 | A1 | 9/2013 | Lewis | |
| 2014/0071539 | A1 | 3/2014 | Gao | |
| 2014/0177023 | A1 | 6/2014 | Gao et al. | |
| 2014/0218468 | A1 | 8/2014 | Gao et al. | |
| 2014/0267420 | A1 | 9/2014 | Schowengerdt et al. | |
| 2014/0281547 | A1 | 9/2014 | Modzelewski et al. | |
| 2014/0282911 | A1 | 9/2014 | Bare et al. | |
| 2014/0306866 | A1 | 10/2014 | Miller et al. | |
| 2014/0333413 | A1 | 11/2014 | Kursun et al. | |
| 2014/0337634 | A1 | 11/2014 | Starner et al. | |
| 2015/0016777 | A1 | 1/2015 | Abovitz et al. | |
| 2015/0089222 | A1 | 3/2015 | White et al. | |
| 2015/0103306 | A1 | 4/2015 | Kaji et al. | |
| 2015/0119667 | A1 | 4/2015 | Reihman et al. | |
| 2015/0178939 | A1 | 6/2015 | Bradski et al. | |
| 2015/0189006 | A1 | 7/2015 | Smus et al. | |
| 2015/0205126 | A1 | 7/2015 | Schowengerdt | |
| 2015/0215292 | A1 | 7/2015 | Novicov et al. | |
| 2015/0222883 | A1 | 8/2015 | Welch | |
| 2015/0222884 | A1 | 8/2015 | Cheng | |
| 2015/0243100 | A1 | 8/2015 | Abovitz et al. | |
| 2015/0248702 | A1 | 9/2015 | Chatterton | |
| 2015/0268415 | A1 | 9/2015 | Schowengerdt et al. | |
| 2015/0294108 | A1 | 10/2015 | Kim et al. | |
| 2015/0302652 | A1 | 10/2015 | Miller et al. | |
| 2015/0309263 | A2 | 10/2015 | Abovitz et al. | |
| 2015/0326570 | A1 | 11/2015 | Publicover et al. | |
| 2015/0346490 | A1 | 12/2015 | TeKolste et al. | |
| 2015/0346495 | A1 | 12/2015 | Welch et al. | |
| 2015/0371214 | A1 | 12/2015 | Schröder et al. | |
| 2016/0011419 | A1 | 1/2016 | Gao | |
| 2016/0026253 | A1 | 1/2016 | Bradski et al. | |
| 2016/0062623 | A1 | 3/2016 | Howard et al. | |
| 2016/0099774 | A1 | 4/2016 | Sim et al. | |
| 2016/0142703 | A1 | 5/2016 | Park et al. | |
| 2016/0142891 | A1 | 5/2016 | Virhiä et al. | |
| 2016/0150406 | A1 | 5/2016 | Vincent et al. | |
| 2016/0164867 | A1 | 6/2016 | Jung et al. | |
| 2016/0180072 | A1 | 6/2016 | Ligatti et al. | |
| 2016/0212103 | A1 | 7/2016 | Rhoads et al. | |
| 2016/0227358 | A1 | 8/2016 | Lo | |
| 2016/0269376 | A1 | 9/2016 | Goyal | |
| 2016/0275518 | A1 | 9/2016 | Bowles et al. | |
| 2016/0330182 | A1 | 11/2016 | Jeon et al. | |
| 2017/0004475 | A1 | 1/2017 | White et al. | |
| 2017/0077974 | A1 | 3/2017 | Aoki et al. | |
| 2017/0116846 | A1 | 4/2017 | Wengrovitz et al. | |
| 2017/0150533 | A1* | 5/2017 | Alipour ................. | H04W 76/10 |
| 2017/0295492 | A1 | 10/2017 | Nakagawa | |
| 2017/0357973 | A1* | 12/2017 | Van Os ............... | G06Q 20/321 |
| 2018/0336332 | A1 | 11/2018 | Singh et al. | |
| 2021/0199960 | A1 | 7/2021 | Singh et al. | |
| 2024/0053605 | A1 | 2/2024 | Singh et al. | |

FOREIGN PATENT DOCUMENTS

| | | |
|---|---|---|
| JP | 2007228554 A | 9/2007 |
| JP | 2007323339 A | 12/2007 |
| JP | 2009135688 A | 6/2009 |
| JP | 2012157006 A | 8/2012 |

(56) References Cited

FOREIGN PATENT DOCUMENTS

| | | | |
|----|------------|-----|---------|
| JP | 2013515562 | A   | 5/2013  |
| JP | 2014523553 | A   | 9/2014  |
| JP | 2017500834 | A   | 1/2017  |
| JP | 2014225096 | A   | 7/2017  |
| WO | 2011026097 | A1  | 3/2011  |
| WO | 2013100898 | A1  | 7/2013  |
| WO | 2018217542 | A1  | 11/2018 |

OTHER PUBLICATIONS

AU2018271790 Examination Report dated Jun. 22, 2022.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit. edu/raskar/book/ BimberRaskarAugmentedRealityBook.pdf.
International Preliminary Report for PCT Application No. PCT/ US18/33242, dated Nov. 26, 2019.
International Search Report and Written Opinion for PCT Application No. PCT/US18/33242, dated Sep. 19, 2018.
Invitation to Pay Additional Fees and, Where Applicable, Protest Fee for PCT Application No. PCT/US18/33242, dated Jul. 20, 2018.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
JP2022-186380 Office Action mailed Jan. 24, 2024.
JP2022-84319 Office Action dated Aug. 24, 2022.
JP2022-84319 Office Action mailed Feb. 21, 2023.
KR2023-7015702 Office Action dated Sep. 26, 2023.
Tanriverdi and Jacob, "Interacting With Eye Movements in Virtual Environments," Department of Electrical Engineering and Computer Science, Tufts University, Medford, MA—paper/Proc. AMC CHI 2000 Human Factors in Computing Systems Conference, pp. 265-272, Addison-Wesley/ACM Press (2000).
Vapen, et al., "2-clickAuth—Optical Challenge-Response Authentication," IEEE Computer Society—Availability, Reliability, and Security, 2010. ARES '10 International Conference on Feb. 15, 2010.
Wikipedia: "Bluetooth," printed Nov. 17, 2016, in 22 pages; URL: https://en.wikipedia.org/wiki/Bluetooth#Pairing_and_bonding.
JP2024-62630 Office Action mailed Sep. 30, 2024.
EP21183149.0 Examination Report dated Dec. 3, 2025.

* cited by examiner

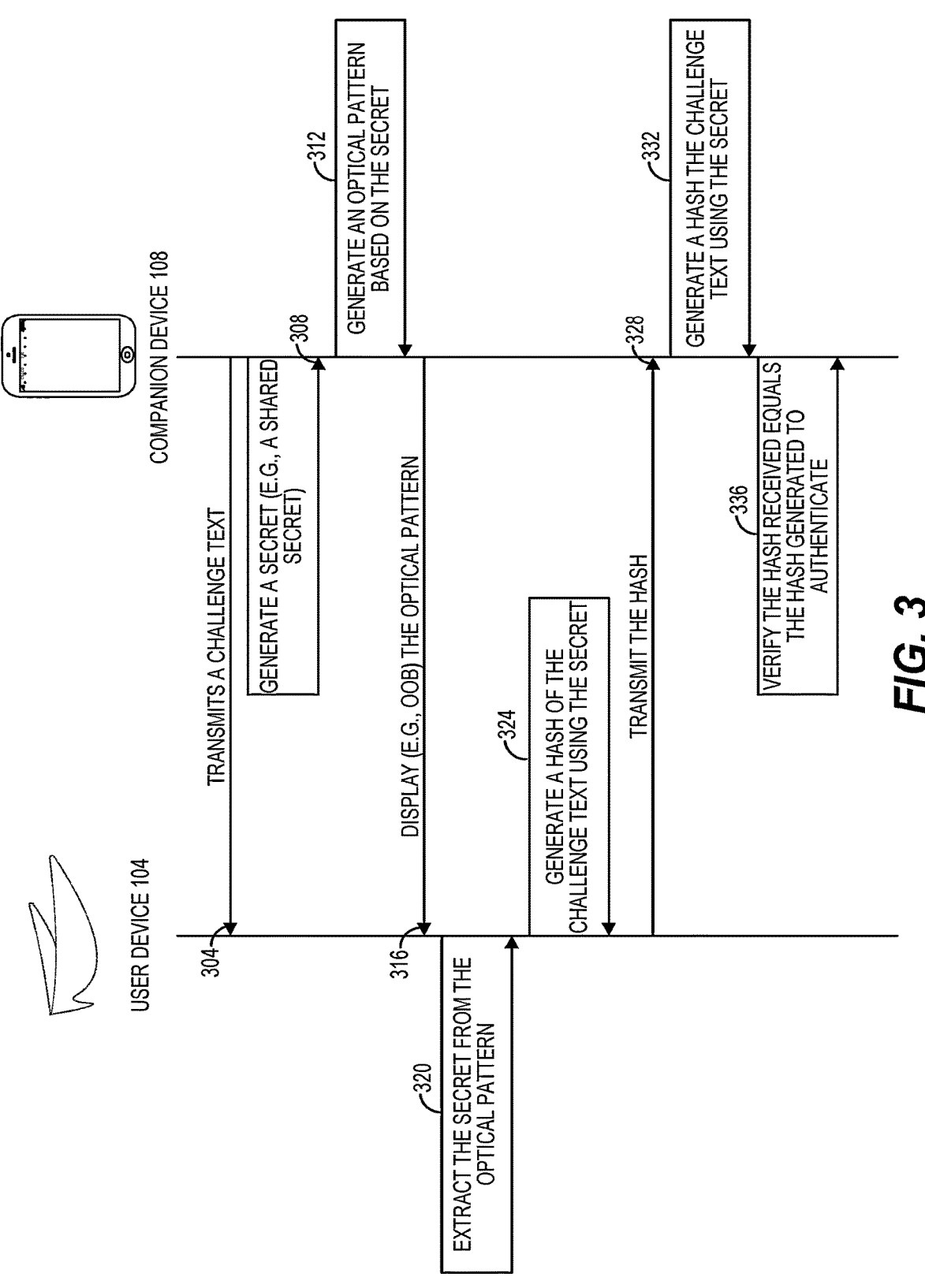

COMPANION DEVICE 108

USER DEVICE 104

TRANSMITS A CHALLENGE TEXT

304

GENERATE A SECRET (E.G., A SHARED SECRET)

308

GENERATE AN OPTICAL PATTERN BASED ON THE SECRET

312

DISPLAY (E.G., OOB) THE OPTICAL PATTERN

316

EXTRACT THE SECRET FROM THE OPTICAL PATTERN

320

GENERATE A HASH OF THE CHALLENGE TEXT USING THE SECRET

324

TRANSMIT THE HASH

328

GENERATE A HASH THE CHALLENGE TEXT USING THE SECRET

332

VERIFY THE HASH RECEIVED EQUALS THE HASH GENERATED TO AUTHENTICATE

GENERATE A FIRST SHARED DATA ⟋ 504

RECEIVE FIRST COMMUNICATION, FIRST COMMUNICATION GENERATED BASED ON FIRST SHARED DATA ⟋ 508

EXTRACT FIRST DATA FROM THE FIRST COMMUNICATION ⟋ 512

AUTHENTICATE THE DEVICE BASED ON THE FIRST DATA EXTRACTED FROM THE FIRST COMMUNICATION ⟋ 516

PAIRING WITH COMPANION DEVICE

PRIORITY CLAIM

This application is a continuation of U.S. Application Ser. No. 18/493,113, filed Oct. 24, 2023, titled "PAIRING WITH COMPANION DEVICE", which is a continuation of U.S. Application Ser. No. 17/179,110, filed Feb. 18, 2021, titled "PAIRING WITH COMPANION DEVICE", which is a continuation of U.S. application Ser. No. 15/982,844, filed May 17, 2018, titled "PAIRING WITH COMPANION DEVICE", which claims the benefit of priority to U.S. Provisional Application No. 62/509,427, filed May 22, 2017, titled "PAIRING WITH COMPANION DEVICE". The entire contents of each of the above-listed applications are hereby incorporated by reference into this application.

FIELD

The present disclosure relates to systems and methods for secure data transfer, and in particular to systems and methods for device pairing and authentication for secure data transfer.

BACKGROUND

To securely transfer data between a user device (e.g., a head mounted display) and a companion device (e.g., another user device, such as a mobile device or a totem), the user device and the companion device need to pair to each other. The process of pairing to each other can include the user device authenticating that the companion device is authorized to communicate with the user device. After authentication, the user device and the companion device can establish shared information or data (e.g., a shared key, shared secret, or shared signing key) which can be used to encrypt data being transferred between these two devices. Conventional pairing processes between devices can be cumbersome and involve multiple steps such as typing in a personal identification number (PIN) on both devices.

SUMMARY

In one aspect, a wearable display system is disclosed. The wearable display system comprises: an image capture device configured to capture images of a companion device; non-transitory computer-readable storage medium configured to store the images of the companion device and executable instructions; and a processor in communication with the image capture device and the non-transitory computer-readable storage medium, the processor programmed by the executable instructions to: receive a first image of a first optical pattern displayed by the companion device captured by the image capture device, wherein the first optical pattern is generated by the companion device based on first shared data; extract first data from the first optical pattern in the received first image; and authenticate the companion device based on the first data extracted from the first optical pattern.

In another aspect, a method for device authentication is disclosed. The method is under control of a hardware processor and comprises: receiving a data object via a communication channel; receiving an image of an optical pattern displayed by a companion device, wherein the optical pattern is generated by the companion device using shared data; extracting first data from the optical pattern in the received image; generating a transformation of the data object using the first data; and transmitting the transformation of the data object via the communication channel to the companion device for authentication.

In yet another aspect, a head mounted display system is disclosed. The head mounted display system comprises: non-transitory computer-readable storage medium storing executable instructions; and a processor in communication with the non-transitory computer-readable storage medium, the processor programmed by the executable instructions to: receive a first communication from a device, wherein the first communication is generated by the device based on first shared data; extract first data from the first communication; and authenticate the device based on the first data extracted from the first communication.

In a further aspect, a head mounted display system is disclosed. The head mounted display system comprises: non-transitory computer-readable storage medium storing executable instructions; and a processor in communication with the non-transitory computer-readable storage medium, the processor programmed by the executable instructions to: receive a first communication comprising a first data object from a first device, wherein the first communication is generated based at least partly on first shared data, wherein the first device is configured to send the first shared data to a third device; receive a second communication comprising a second data object from a second device, wherein the second communication is generated based at least partly on second shared data, wherein the second device is configured to send the second shared data to the third device; transmit the first data object and the second data object to the third device, wherein the third device is configured to authenticate the head mounted display system, the first device, and the second device based at least partly on the first shared data from the first device, the second shared data from the second device, the first data object from the head mounted display system, and the second data object from the head mounted display system; and receive a third communication comprising a third data object from the third device, wherein the third data object indicates the third device has successfully authenticated the head mounted display system, the first device, and the second device.

Disclosed herein are systems and methods for device authentication. In some embodiments, after receiving an image of an optical pattern displayed by a device based on shared information, the system or method can extract information from the optical pattern in the image received. The method can authenticate the device based on the information extracted from the optical pattern.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the subject matter of the disclosure.

BRIEF DESCRIPTION OF THE DRAWINGS

FIG. 3 is an interaction diagram illustrating device authentication using a challenge text, according to one embodiment.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

A wearable display system such as a head mounted display (HMD) may be configured to work with a companion device such as a handheld, user-input device (e.g., a totem). In order for the HMD and the companion device to be able to work together (e.g., to exchange information or data wirelessly), the companion device and the HMD may need to first be paired with each other. The present disclosure provides systems and methods for pairing such devices.

The HMD can include an outward-facing image capture device, such as a camera, which can image an environment of a user of the HMD. The image capture device can be used to capture and obtain information or data (e.g., a key or secret) displayed on the companion device (e.g., a totem with a display or a light source) in order to establish shared information or data (e.g., a shared key, a shared secret, or a signing key) between the HMD and the companion device. The shared data can in turn be used by the HMD or the companion device to encrypt/decrypt data for/from a secure data transfer. Systems and methods for efficient and secure device pairing and authentication are disclosed.

Figure 1:
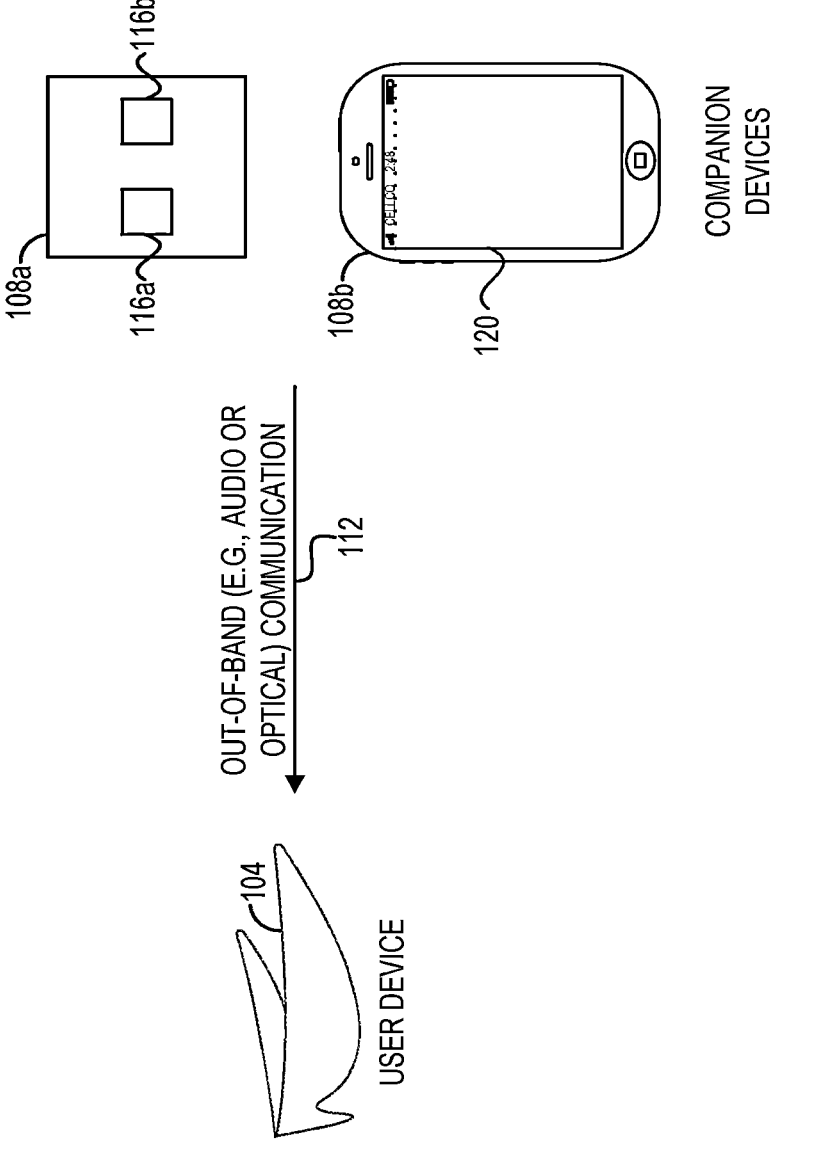
FIG. 1 illustrates device authentication, according to one embodiment.

FIG. 1 illustrates device authentication, according to one embodiment. A user device 104 can authenticate a companion device, such as a totem 108a (e.g., functioning as a virtual user input device) or a cellphone 108b. For the totem 108a, a user may use a thumb to interact with an input surface (e.g., a touchpad) of the totem 108a and may use other fingers to hold the totem 108a. The user device 104 can be an HMD, a wearable display system, a tablet computer, a cellphone, or a mobile device. The companion device (e.g., the totem 108a and/or the cellphone 108b) can be an HMD, a wearable display system, a tablet computer, a totem, or a mobile device. Examples of HMD and totems are described below with reference to Figures (FIGS. 9-14.

The user device 104 and the totem 108a may communicate wirelessly over a radio frequency (RF) communication channel (e.g., WiFi, Bluetooth, etc.). Communication within the bandwidth of the RF channel is generally referred to as in-band communication and may represent the primary communication channel between the two devices. The user device 104 and the totem 108a may also be configured to communicate over a second, different communication channel (e.g., an optical channel, an acoustic channel, a near-field-communication (NFC) channel, etc.). Such communication is generally referred to as out-of-band (OOB) communication.

With reference to FIG. 1, the user device 104 can receive out-of-band communication 112 from a companion device (e.g., the totem 108a and/or the cellphone 108b). The out-of-band communication 112 can include an optical communication (e.g., a one-dimensional code, such as a barcode, or a two-dimensional code, such as a quick response (QR) code), an audio communication (e.g., inaudible to human ears or ultrasonic), a spoken phrase (e.g., an alphanumeric phrase), one or more spectral qualities of a spoken phrase, biometric information or data (e.g., iris codes) of a user, or any combination thereof. An optical communication can include a visual communication (in a wavelength band perceptible to human users, such as, from about 400 nm to 700 nm) or a non-visual communication (e.g., in the infrared or ultraviolet wavelength bands). The user device 104 can receive the out-of-band communication 112 through explicit user interaction or no explicit user interaction. For example, the user device 104 may be in the pairing mode and receive the out-of-band communication 112 automatically. As another example, the user device 104 can be constantly monitoring its surrounding using its camera to determine the presence of the visual communication on the companion device.

A companion device (e.g., the totem 108a and/or the cellphone 108b) can generate and display a visual pattern using its display or another optical device. For example, the totem 108a can have a green light-emitting diode (LED) 116a and a red LED 116b. The totem 108a can display the visual pattern using the two LEDs. For example, to display the number "57," the totem 108a can blink the green LED five times and the red LED seven times. The user device 104 can, using its image capture device, capture this pattern and extract the number "57" from the captured pattern using a computer vision technique. The totem 108a can generate the visual pattern and the user device 104 can extract from the visual pattern based on a predetermined protocol. For example, the predetermined protocol can specify that the shared data is the sum of the number of times the red LED 116b blinks and ten times the number of times the green LED 116a blinks. Advantageously, the totem 108a does not need to include an image capture device or a microphone for the user device 104 to authenticate the companion device 108.

As another example, the cellphone 108b can display the number "57" on its display 120. The number "57" can be displayed as a part of a two-dimensional code, such as a QR code, or a two-dimensional pattern. The user device 104 can, using its image capture device, capture the number, two-dimensional code, or two-dimensional pattern displayed.

The user device 104 can extract the number "57" from the captured image using a computer vision technique. The cell phone 108b can generate a visual pattern and the user device 104 can extract from the visual pattern based on a predetermined protocol. Advantageously no user input or initiation may be required for device authentication.

Example Device Authentication Using Shared Data from a User Device

Figure 2:
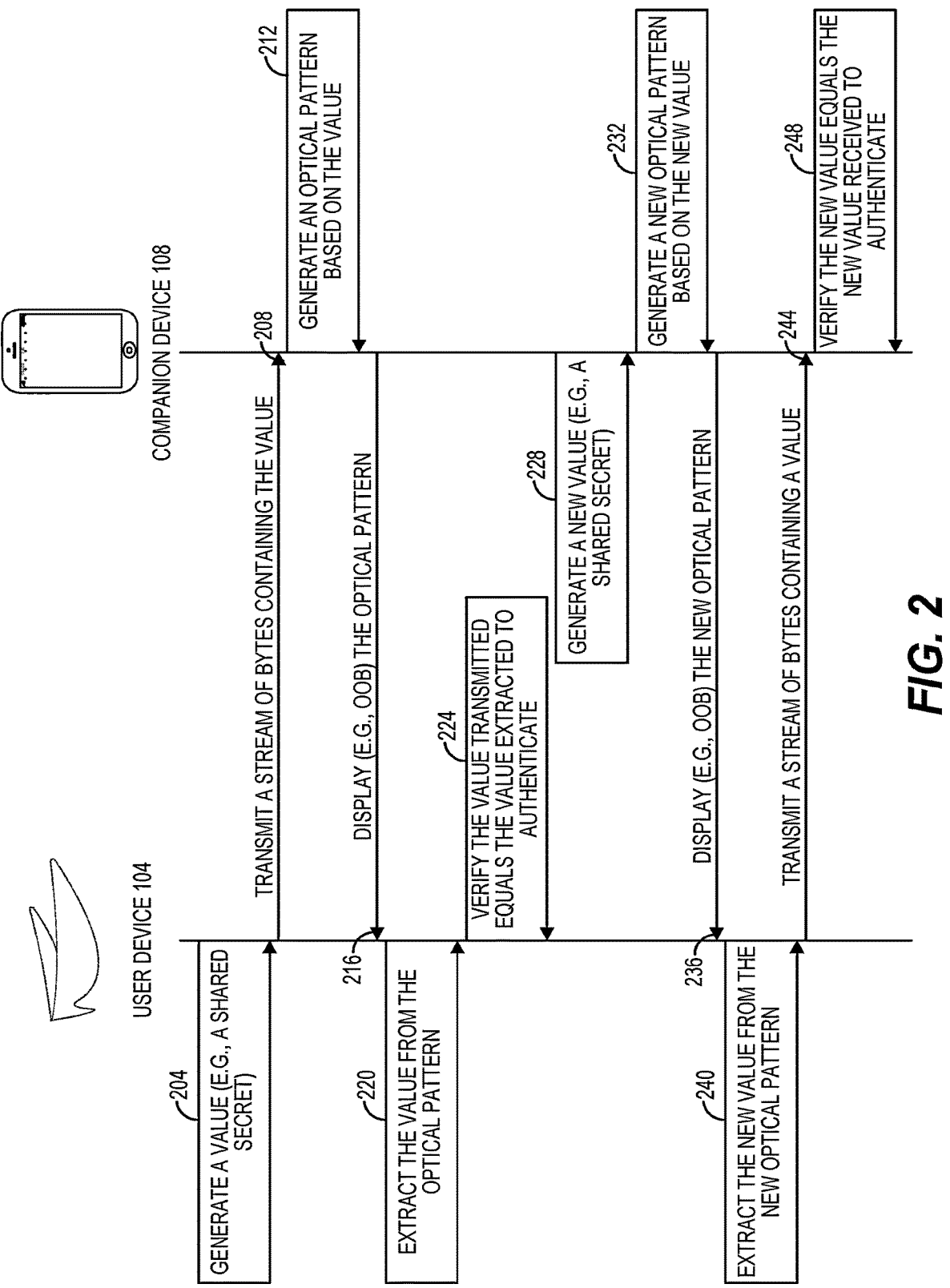
FIG. 2 is an interaction diagram illustrating device authentication using shared information or data from a user device, according to one embodiment.

In some embodiments, shared information or data (e.g., a shared secret, a shared key, or a signing key) can be sent by a user device 104 and received by a companion device 108. FIG. 2 is an interaction diagram illustrating device authentication using shared data from a user device, according to one embodiment. The user device 104 can generate shared data at interaction 204. For example, the user device 104 can generate a value randomly. As another example, the shared data can be predetermined. Subsequently, the user device 104 can transmit the shared data to the companion device 108 at interaction 208. For example the user device 104 can transmit a stream of bytes containing the value to the companion device 108 at interaction 208 via a communication channel. The communication channel can be a wireless communication channel, such as a Wi-Fi communication (e.g., at about 2.4 GHz or 5 GHZ) or a near field communication (NFC) channel (e.g., at about 14 MHz). In some embodiments, the communication channel can be an in-band communication channel that can be used for subsequent secure data transfer.

The shared data can be generated by the user device 104. Alternatively or additionally, the shared data can be generated by or based on a user of the user device 104 and/or the companion device 108 trying to pair the two devices. For example, the shared data can include a spoken phrase of the user trying to pair the two devices, such as an alphanumeric phrase, or one or more spectral qualities of the spoken phrase. The user device 104 and the companion device 108 can each capture the spoken phrase using their respective microphone. The user device 104 and the companion device 108 can obtain the phrase in the spoken phrase using a speech recognition technique. Examples of speech recognition techniques are described herein with reference to FIG. 5.

As another example, the shared data can include biometric information or data of a user of the user device 104 and/or the companion device 108 trying to pair the two devices. The user device 104 and the companion device 108 can each capture an image of an eye of the user. The user device 104 and the companion device 108 can each extract or generate a biometric template, such as an iris code, based on the image of the eye of the user each captured. Iris codes can be computed in a variety of ways. For example in some embodiments, iris codes can be generated according to algorithms developed by John Daugman for iris biometrics (see, e.g., U.S. Pat. No. 5,291,560). For example, the iris code can be based on a convolution of an image of an iris of the eye (e.g., in polar coordinates) with two dimensional bandpass filters (e.g., Gabor filters), and the iris code can be represented as a two bit number (e.g., whether the response to a particular Gabor filter is positive or negative).

The companion device 108 receives shared data from the user device 104. For example, the companion device 108 can receive a stream of bytes containing a value via the communication channel. After receiving the shared data, the companion device 108 can generate a transformation of the shared data at interaction 212. For example, the companion device 108 can generate a visual pattern based on the value at interaction 212. The visual pattern can be a one-dimensional pattern (e.g., a barcode) or a two-dimensional pattern (e.g., a QR code). As another example, the companion device 108 can generate audio signals, including audio signals that are inaudible to human ears such as ultrasonic audio signals. The audio signals may be recorded by a microphone of the user device 104, even if the audio signals are inaudible to human ears.

The companion device 108 can communicate the transformation of the shared data to the user device 104 via an out-of-band communication channel at interaction 216. For example, the companion device 108 can display the visual pattern at interaction 216 using its display or another optical device (e.g., a light source). As another example, the companion device 108 can transmit the audio signals at interaction 216 using its speakers. The user device 104 can receive the transformation of the shared data through explicit user interaction. For example, the user of the user device 104 can select when a camera of the user device 104 captures the visual pattern or when a microphone of the user device 104 records the audio signals. Alternatively or in addition, the user device 104 can receive the transformation of the shared data through no explicit user interaction. For example, the user device 104 may be in the pairing mode and receive the communication automatically. As another example, the user device 104 can be constantly monitoring its surrounding using its camera and/or microphone to determine the presence of the visual signals on the companion device 108 and/or any audio signals transmitted by the companion device 108.

Subsequently, the user device 104 can extract the shared data from the received transformation at interaction 220. In one example, the companion device 108 can display the visual pattern, generated based on the value, using its display or another optical device (e.g., a light source). The optical device may emit human-perceivable visual light or non-visual light (e.g., infrared or ultraviolet). If the companion device 108 is a totem (e.g., the totem 108a) with a green light-emitting diode (LED) and a red LED, the companion device 108 can display the visual pattern using the two LEDs. The user device 104 can, using its image capture device, capture the visual pattern and extract a number or a value from the visual pattern capture using a computer vision technique at interaction 220. If the companion device 108 is a cellphone (e.g., the cellphone 108b) with a display, the companion device 108 can display the visual pattern on its display. The user device 104 can, using its image capture device, capture the visual pattern displayed and extract a number from the visual pattern capture using a computer vision technique at interaction 220. Examples of computer vision recognition techniques are described herein with reference to FIG. 5.

The user device 104 can verify consistency of the shared data sent to the companion device 108 (e.g., the shared data transmitted to the companion device 108 at interaction 208) and the shared data received and extracted (e.g., the shared data communicated by the companion device 108 at interaction 216 and subsequently extracted by the user device 104 at interaction 220) at interaction 224. If the consistency of the shared data is verified, then the companion device 108 is authenticated to the user device 104. For example, if the user device 104 sent a number to the companion device 108 at interaction 208, the user device 104 can verify at interaction 224 that the number extracted at interaction 220 is the same number. As another example, the iris codes generated by the user device 104 and the companion device 108 may be sufficiently similar. Because of the variability of iris codes, consistency of the shared data based on iris codes can allow a certain amount of variability.

After authentication of the companion device 108 to the user device 104, the user device 104 and the companion device 108 can transfer data between each other securely. In some embodiments, the user device 104 can be authenticated to the companion device 108. At interaction 228, the companion device 108 can generate new shared information or data (e.g., a new shared secret or a new shared key), as compared to the shared data transmitted by the user device 104 to the companion device 108 at interaction 208. For example, the companion device 108 can generate a new value, as compared to the value transmitted as a stream of bytes at interaction 208.

After generating the new shared data at interaction 228, the companion device 108 can generate a new transformation of the new shared data at interaction 232, as compared to the transformation generated at interaction 212. For example, the companion device 108 can generate a new visual pattern (e.g., a one-dimensional or two-dimensional code) or new audio signals at interaction 232 based on the new value. As another example, the companion device 108 can generate audio signals at interaction 232 based on the new value.

The companion device 108 can communicate the new transformation of the new shared data to the user device 104 via an out-of-band communication channel at interaction 236 (e.g., the out-of-band communication channel used at interaction 216). For example, the companion device 108 can display the visual pattern at interaction 236 using its display or another optical device (e.g., a light source). As another example, the companion device 108 can transmit the audio signals at interaction 236 using its speakers. The user device 104 can receive the transformation of the shared data through explicit user interaction or no explicit user interaction as discussed with reference to interaction 216.

Subsequently, the user device 104 can extract the new shared data from the received new transformation at interaction 240. In one example, the companion device 108 can display the new visual pattern, generated at interaction 232 based on the new value, using its display or another optical device. After extracting the new shared data from the received new transformation at interaction 240, the user device 104 can transmit the new shared data to the companion device 108 at interaction 244. For example, the user device 104 can transmit a stream of bytes containing the new value at interaction 244 via a communication channel. The communication channel can be a wireless communication channel, such as a Wi-Fi communication or a near field communication (NFC) channel. The communication channel can be an in-band communication channel that can be used for subsequent secure data transfer and/or the communication channel used at interaction 208.

The companion device 108 can verify consistency of the new shared data sent to the user device 104 (e.g., the new shared data communicated to the user device 104 at interaction 236) and the received new shared data (e.g., the new shared data extracted by the user device 104 at interaction 240 and subsequently transmitted to the companion device 108 at interaction 244) at interaction 248. If the consistency of the new shared data is verified, then the user device 104 is authenticated to the companion device 108. For example, if the new transformation sent by the companion device 108 to the user device 104 at interaction 236 is a number, the companion device 104 can verify at interaction 248 that the same number is received.

Advantageously, the companion device 108 does not need to include an image capture device or a microphone for the user device 104 to be authenticated to the companion device 108. For example, the companion device 108 can be a simple totem (e.g., the totem 108*a*) with two LEDs of different colors or with a speaker for out-of-band communication. Although FIG. 2 illustrates that the companion device 108 is authenticated to the user device 104 first, in some embodiments, the user device 104 can be authenticated to the companion device 108 first.

Example Device Authentication Using a Challenge Object

In some embodiments, a companion device 108 can authenticate a user device 104 using a challenge object (e.g., a challenge text). FIG. 3 is an interaction diagram illustrating device authentication using a challenge text, according to one embodiment. The companion device 108 can transmit an information or data object (e.g., a challenge text) to the user device 104 at interaction 304. For example, the companion device 108 can transmit a stream of bytes containing a challenge text to the user device 104 at interaction 304 via a communication channel. The communication channel used for transmitting the data object can be a wireless communication channel, such as a Wi-Fi communication or a near field communication (NFC) channel.

After transmitting the challenge text at interaction 304, the companion device 108 can generate shared information or data (e.g., a shared secret, a shared key, or a signing key) at interaction 308. For example, the companion device 108 can generate the shared data randomly. As another example, the shared data can be predetermined.

After generating the shared data at interaction 308, the companion device 108 can generate a transformation of the shared data at interaction 312. For example, the companion device 108 can generate a visual pattern (e.g., a one-dimensional pattern, or a two-dimensional pattern) or audio signals (e.g., supersonic audio signals or audio signals inaudible to human ears) at interaction 312 based on the shared data generated at interaction 308.

The companion device 108 can communicate the transformation of the shared data to the user device 104 via an out-of-band communication channel at interaction 316. The out-of-band communication channel can be a visual communication channel for transmitting the visual pattern or an audio communication channel for transmitting the audio signals. For example, the companion device 108 can display the visual pattern at interaction 316 using its display or another optical device (e.g., a light source). As another example, the companion device 108 can transmit the audio signals at interaction 316 using its speakers. The user device 104 can receive the transformation of the shared data through explicit user interaction or no explicit user interaction, as discussed with reference to interaction 216.

Subsequently, the user device 104 can extract the shared data from the received transformation at interaction 320. In one example, the companion device 108 can display the visual pattern at interaction 316 using its display or another optical device (e.g., two LEDs of different colors). The user device 104 can capture an image of the visual pattern and extract the shared data from the visual pattern received using a computer vision technique at interaction 320. As another example, the companion device 108 can communicate the audio signals at interaction 316 using its speaker. The audio signals may be recorded by a microphone of the user device

104, even if the audio signals are inaudible to human ears. The user device 104 can extract the shared data in the audio signals at interaction 320.

The user device 104 can generate a transformation of the data object using the shared data at interaction 324. For example, the user device 104 can generate a hash (e.g., secure hash algorithm (SHA)-2) of the challenge text using the shared data at interaction 324. As another example, the user device 104 can encrypt the challenge text using the shared key at interaction 324.

The user device 104 can transmit the transformation of the data object generated at interaction 324 to the companion device 108 at interaction 328. The communication channel used for transmitting the data object from the user device 104 to the companion device 108 can be a wireless communication channel, such as a Wi-Fi communication, or a near field communication (NFC) channel. The communication channels at interactions 304 and 328 can be the same in some implementations. In some embodiments, the communication channel used for transmitting the transformation of the data object can be an in-band communication channel that can be used for subsequent secure data transfer.

The companion device 108 receives the transformation of the data object from the user device 104. Prior to or after receiving the transformation of the data object, the companion device 108 can generate a transformation of the data object using the shared data at interaction 332. For example, the companion device 108 can generate a hash of the challenge text using the shared data at interaction 332. As another example, the companion device 108 can encrypt the challenge text using the shared key at interaction 332.

The companion device 108 can verify consistency of the shared data generated at interaction 332 and the shared data received from the user device 104. If the consistency of the shared data is verified, then the user device 104 is authenticated to the companion device 108. For example, if the hash received by the companion device 108 from the user device 104 is a number, the companion device 104 can verify that the hash generated at interaction 332 is also the same number. After authentication, the user device 104 and the companion device 108 can transfer data between each other securely.

Advantageously, the companion device 108 does not need to include an image capture device or a microphone for the user device 104 to authenticate the companion device 108. For example, the companion device 108 can be a simple totem with two LEDs of different colors or with a speaker for out-of-band communication. Although FIG. 3 illustrates that the companion device 108 authenticates the user device 104, in some embodiments, the user device 104 can authenticate the companion device 108 using the method illustrated in FIG. 3.

Figure 4:
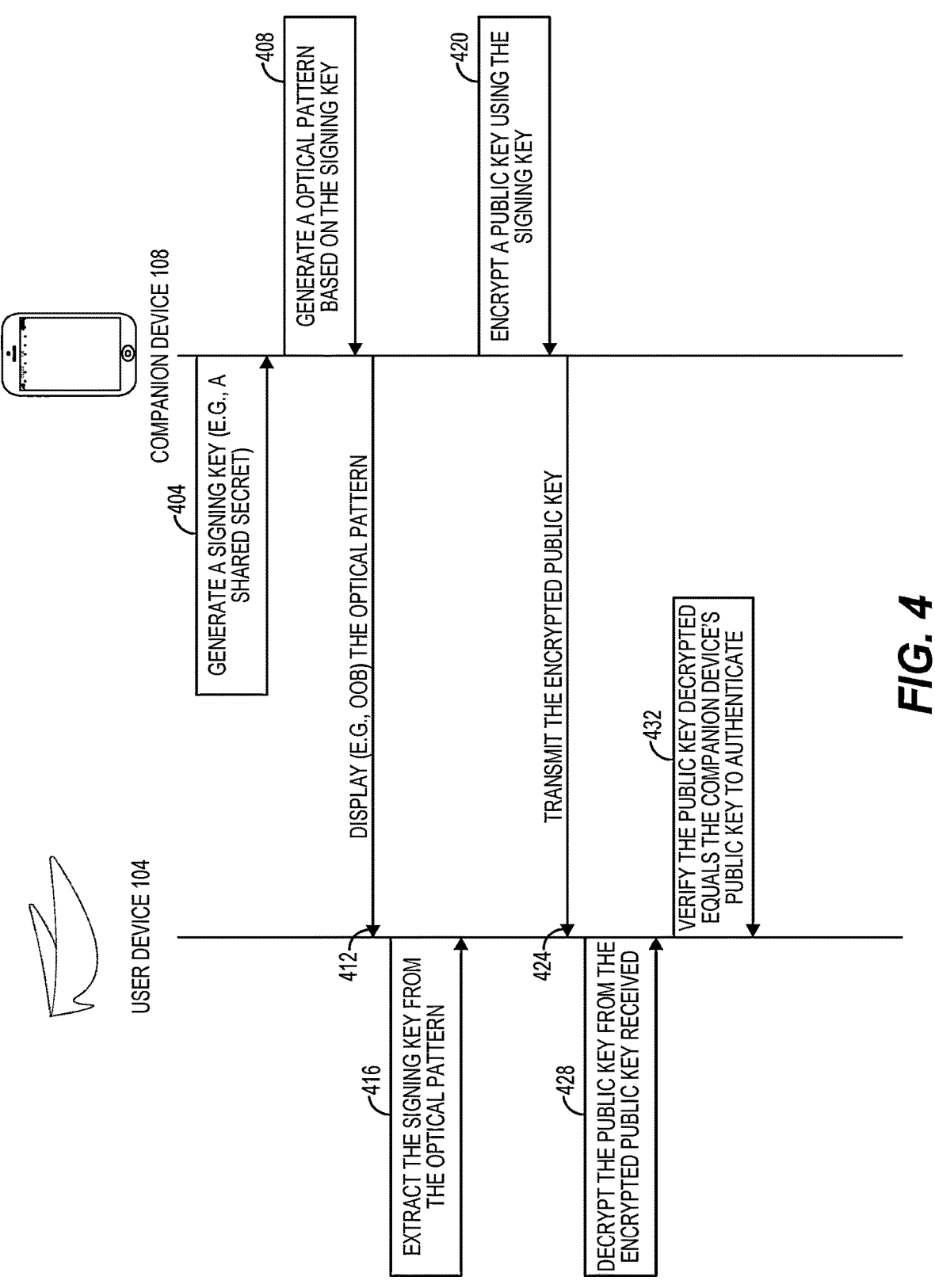
FIG. 4 is an interaction diagram illustrating device authentication using shared information or data generated by a companion device, according to one embodiment.

Example Device Authentication Using Shared Data Generated by a Companion Device In some embodiments, a user device 104 can authenticate a companion device 108 after receiving shared information or data (e.g., a shared secret, a shared key, or a signing key), generated by the companion device 108, in a transformed form. FIG. 4, is an interaction diagram illustrating device authentication using shared data generated by the companion device 108, according to one embodiment. The companion device 108 can generate shared data (e.g., a shared secret, a shared key, or a signing key) at interaction 404. For example, the companion device 108 can generate a signing key randomly. As another example, the shared data can be predetermined. The length of the signing key can be, for example, 64, 128, 256, 512, 1024, or more bits.

After generating the shared data at interaction 404, the companion device 108 can generate a transformation of the shared data at interaction 408. For example, the companion device 108 can generate a visual pattern (e.g., a one-dimensional pattern or a two-dimensional pattern) or audio signals (e.g., supersonic audio signals or audio signals inaudible to human ears) at interaction 408 based on the shared data generated at interaction 404. The visual pattern can be a one-dimensional pattern (e.g., a barcode) or a two-dimensional pattern (e.g., a QR code).

The companion device 108 can communicate the transformation of the shared data to the user device 104 via an out-of-band communication channel at interaction 412. The out-of-band communication channel can be a visual communication channel for transmitting the visual pattern or an audio communication channel for transmitting the audio signals. For example, the companion device 108 can display the visual pattern at interaction 412 using its display or another optical device (e.g., a light source). As another example, the companion device 108 can transmit the audio signals at interaction 412 using its speakers. The user device 104 can receive the transformation of the shared data through explicit user interaction or no explicit user interaction, as discussed with reference to interaction 216.

Subsequently, the user device 104 can extract the shared data from the received transformation at interaction 416. In one example, the companion device 108 can display the visual pattern at interaction 412 using its display or another optical device (e.g., two LEDs of different colors). The user device 104 can capture an image of the visual pattern and extract the shared data from the visual pattern received using a computer vision technique at interaction 416. As another example, the companion device 108 can communicate the audio signals using its speaker at interaction 412. The audio signals may be recorded by a microphone of the user device 104, even if the audio signals are inaudible to human ears. The user device 104 can extract the shared data in the audio signals at interaction 416.

The companion device 108 can generate the transformation of the shared data at interaction 408 and the user device 104 can extract the shared data at interaction 416 based on a predetermined protocol. For example, the companion device 108 can blink its green LED five times and its red LED seven times, based on a predetermined protocol, if the shared data is the number "57." The user device 104 can extract the number "57" from the blinking pattern based on the predetermined protocol. The predetermined protocol can specify that the shared data is the sum of the number of times the red LED blinks and ten times the number of times the green LED blinks.

The companion device 108 can generate a transformation of another shared information or data (also referred to as second shared information or data) at interaction 420 using the shared data (also referred to as first shared data) generated by the companion device 108 at interaction 404. For example, the companion device 108 can encrypt its public key using the signing key generated by the companion device 108 at interaction 404.

The companion device 108 can transmit the transformation of the other shared data (e.g., the second shared data) to the user device 104 at interaction 424. For example, the companion device 108 can transmit the encrypted public key to the user device 104 at interaction 424. The communication channel used for transmitting the encrypted public key can be a wireless communication channel, such as a Wi-Fi communication or a near field communication (NFC) channel. In some embodiments, the communication channel used for transmitting the transformation of the other shared data at interaction 424 can be an in-band communication channel that can be used for subsequently secure data transfer.

The companion device 104 can extract the other shared data (e.g., second share data) from the transformation of the other shared data at interaction 428 using the shared data extracted at interaction 416. The user device 104 can authenticate the companion device 108 at interaction 432 based on the other shared data (e.g., second shared data). For example, the user device 104 can decrypt the encrypted public key at interaction 428 using the signing key extracted at interaction 416. The user device 104 can authenticate the companion device 108 by verifying the consistency of the decrypted public key and the public key of the companion device 108 at interaction 432. The user device 104 can obtain the public key of the companion device 108 from a repository of device public keys. Public key cryptographic techniques (e.g., Rivest-Shamir-Adleman (RSA) encryption) can be used in which each device (e.g., the user device 104 and the companion device 108) is associated with both a public key (that can be disseminated widely) and a private key (that is kept secure and known only to the party). Public key cryptography is an example of asymmetric cryptography in which the key for encryption is different from the key for decryption. In other embodiments, other asymmetric cryptographic techniques can be used. After authentication, the user device 104 and the companion device 108 can transfer data between each other securely.

Advantageously, the companion device 108 does not need to include an image capture device or a microphone for the user device 104 to authenticate the companion device 108. For example, the companion device 108 can be a simple totem with two LEDs of different colors or with a speaker for out-of-band communication. Although FIG. 4 illustrates that the companion device 108 is authenticated to the user device 104, in some embodiments, the user device 104 can be authenticated to the companion device 108 using the method illustrated in FIG. 4.

Example Device Authentication Method

Figure 5:
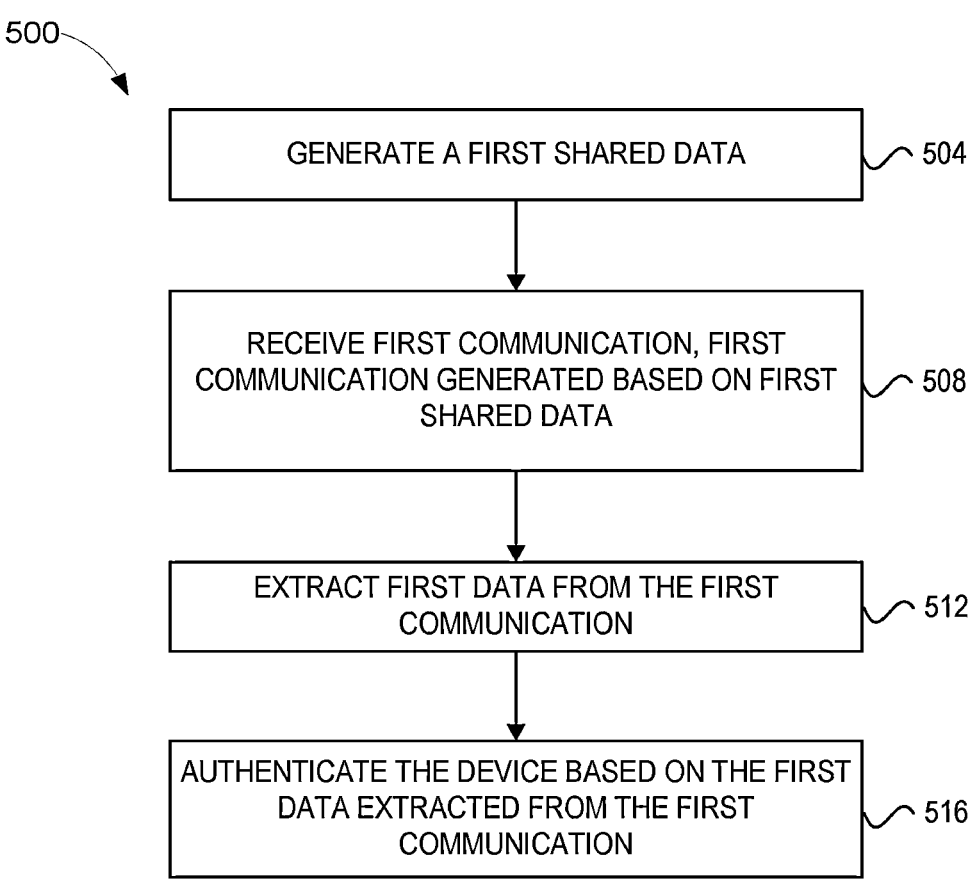
FIG. 5 shows a flow diagram of a device authentication method, according to one embodiment.

FIG. 5 shows a flow diagram of a device authentication method 500. A device, such as a head mounted display or a wearable display system, can implement the method 500. The device can generate first shared information or data at block 504. The first shared data can be a shared secret, a shared key, or a signing key. The device generating the first shared data can be different in different implementations. In some embodiments, a user device 104 can generate the first shared data. For example, the user device 104 generates the first shared data at interaction 204. The user device 104 can transmit the first shared data to the companion device 108 at interaction 208, the companion device 108 can generate a transformation of the first shared data at interaction 212, and the companion device 108 can communicate the transformation of the first shared data to the user device 104 at interaction 216. In some embodiments, a companion device 108 can generate the first shared data. For example, the companion device 108 can generate the first shared data at interaction 308. The device can transmit the first shared data to another device via a first communication channel.

A device can receive a first communication from another device at block 508. The first communication can be generated by the device based on the first shared data. The first communication can include a visual or optical communication (e.g., a one-dimensional optical pattern, such as a barcode, or a two-dimensional optical pattern, such as a quick response (QR) code), an audio communication (e.g., inaudible to human ears or ultrasonic), or any combination thereof. The first shared data can include a spoken phrase (e.g., an alphanumeric phrase), one or more spectral qualities of a spoken phrase, biometric information or data (e.g., iris codes) of a user, or any combination thereof. The first communication can be a transformation of the first shared data and can be received by the device via an out-of-band communication channel, through explicit user interaction or no explicit user interaction. The out-of-band communication channel can be a visual or optical communication channel for transmitting the visual pattern or an audio communication channel for transmitting the audio signals. In some embodiments, the companion device 108 can receive the first communication. For example, the user device 104 can transmit the first communication to the companion device 108 at interaction 208 and the companion device 108 can receive the first communication. The user device 104 can generate the first communication based on the first shared data. In some embodiments, the user device 104 can receive the first communication. For example, the companion device 108 can generate a transformation of the first shared data at interaction 312, can communicate the transformation of the first shared data at interaction 316, and the user device 104 can receive the transformation of the first shared data.

A device can extract the first shared data from the first communication at block 512. For example, the first communication can be a visual communication, such as a visual pattern. The device can receive an image of the visual communication and extract the first shared data using a computer vision technique. As another example, the first shared data can include a spoken phrase of a user trying to pair the two devices, such as an alphanumeric phrase, or one or more spectral qualities of the spoken phrase. The device can obtain the phrase in the spoken phrase using a speech recognition technique. In some embodiments, the user device 104 can extract the first shared data from the received transformation at interaction 220. In some embodiments, the user device 104 can extract the first shared data from the received transformation at interaction 320.

A speech recognition technique can be based on machine learning, such as long short-term memory (LSTM) recurrent neural networks (RNNs). The speech recognition technique can be based on Hidden Markov Models (HMMs), dynamic time warping (DTW)-based speech recognition, machine learning, or end-to-end automatic speech recognition. Machine learning techniques for speech recognition can be based on neural networks, such as long short-term memory (LSTM) recurrent neural networks (RNNs), time delay neural networks (TDNNs), or deep forwarding neural network (DNN), or recurrent neural networks (RNNs).

Non-limiting examples of computer v1s10n techniques include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Hom-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The speech recognition algorithm and the computer vision algorithm can additionally or alternatively be performed by a variety of machine learning algorithms. Once trained, the machine learning algorithm can be stored by the user device 104. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the user device 104 can be configured to utilize a plurality of techniques to generate models for analysis of the aggregated data. Other techniques may include using pre-defined thresholds or data values.

A device can authenticate another device based on the first shared data extracted from the transformation of the first shared data. For example, the device can verify consistency of the first shared data generated at block 504 and the first shared data extracted at block 512. If the consistency of the first shared data is verified, then the devices are authenticated. In some embodiments, the user device 104 can verify the consistency of the first shared data sent to the companion device 108 and the first shared data received from the companion device 108 subsequently extracted by the user device 104.

Optionally, a device (e.g., first device) can receive a second communication from another device (e.g., second device). The second communication can be generated by the second device based on second shared information or data. The second shared data can be generated by the second device. The first device can extract second shared data from the second communication received. The first device can transmit the extracted second shared data to the second. In some embodiments, the second device can receive the extracted second shared data and authenticate the first device based on the extracted second shared data received. To authenticate, the second device can verify consistency of the extracted second shared data received and the second shared data generated.

Alternatively or additionally, a device (e.g., first device) can optionally receive a public key of another device (e.g., second device) and receive an encrypted public key of the second device via a first communication channel. The first communication channel can be a wireless communication channel, such as a Wi-Fi communication channel or a near field communication channel. The encrypted public key of the second device can be encrypted by the second device using the first shared data. The first device can decrypt, using the first shared data, the encrypted public key of the second device to obtain a decrypted public key. The first device can authenticate the second device at block 516 by verifying consistency of the decrypted public key and the public key of the second device.

Figure 6:
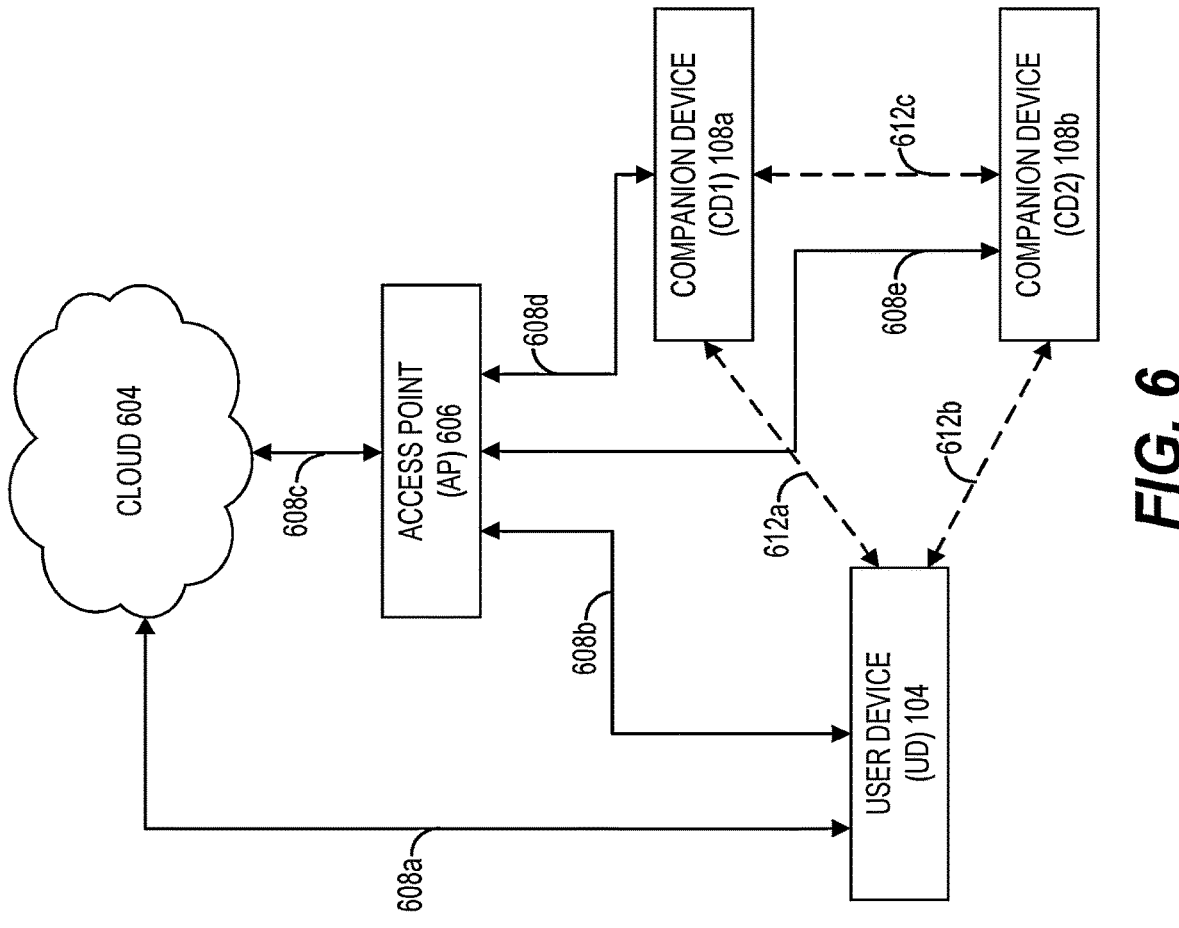
FIG. 6 illustrates device authentication, according to one embodiment.

Example Device Authentication Amongst a User Device and Two Companion Devices FIG. 6 illustrates device authentication, according to one embodiment. A user device (UD) 104 can authenticate two or more companion devices, such as a first companion device (CD1) 108a and a second companion device (CD2) 108b. The user device 104 can be a HMD, a wearable display system, a tablet computer, a cellphone, or a mobile device. Each of the two companion devices 108a, 108b can be a totem (e.g., functioning as a virtual user input device), a HMD, a wearable display system, a tablet computer, a cellphone, or a mobile device. For a totem, a user may use a thumb to interact with an input surface (e.g., a touchpad) of the totem and may use other fingers to hold the totem. Examples of HMD and totems are described below with reference to Figures (FIGS. 9-14.

The user device 104 can be in wired or wireless communication with each companion device 108a, 108b through a cloud 604 or an access point (AP) 606. The communication can be over a radio frequency (RF) communication channel (e.g., WiFi, Bluetooth, etc.). For example, the user device 104 can be connected to the cloud 604 through an instance 608a of the communication channel. As another example, the user device 104 can be connected to the access point (AP) 606, such as a router, through an instance 608b of the communication channel. The access point 612 can itself be connected to the cloud 604 through an instance 608c of the communication channel. The companion devices 108a, 108b can be in wired or wireless communication with each other through the cloud 604 through instances 608d, 608e of the communication channel. For example, the companion devices 108a, 108b can be in close proximity to each and be connected to the cloud 604 through the access point 606 through instances 608d, 608e of the communication channel. In one embodiment, to authenticate, the companion devices 108a, 108b should be connected to the same access point 606 to demonstrate that they are in close proximity with each other. In one embodiment, to authenticate, the user device 104 and companion devices 108a, 108b have to be connected to the same access point 606 to demonstrate that they are in close proximity with one another. Communication within the bandwidth of the wired or wireless channel may represent the primary communication channel (also referred to as a first communication channel) between the three devices.

The user device 104 and the first companion device 108a (or the second companion device 108b) may also be configured to communicate over a second, different communication channel (e.g., an optical channel, an acoustic channel, a near-field-communication (NFC) channel, etc.). For example, the user device 104 can communicate with the first companion device 108a through an instance 612a of the second communication channel, and the user device 104 can communicate with the second companion device 108b through an instance 612b of the second communication channel. Similarly, the first companion device 108a and the second companion device 108b may also be configured to communicate over the second, different communication channel. For example, the companion devices 108a, 108b can communicate with each other through an instance 612c of the second communication channel. Such communication can be referred to as out-of-band (OOB) communication (shown as dotted lines).

For the user device 104 and the companion devices 108a, 108b to authenticate each other and to communicate with each other securely, the first companion device 108a can send first shared information or data to the user device 104 using the instance 612a of the second communication channel in a first transformed form (e.g., as a visual pattern or audio signals). The first shared data can include an identifier of the first companion device 108a (e.g., an address of the first companion device 108a, such as an Internet Protocol (IP) address or a media access control (MAC) address of the first companion device 108a). The first shared data can also include a pair bit (PB) of a particular value (e.g., a value of one), indicating that the first companion device 108a is available for pairing. The first companion device 108a (or another device) can generate the first shared data in the first transformed form. Prior to, at a same time, or after sending the first shared data in the first transformed form to the user device 104, the first companion device 108a can also send the first shared data to the cloud 604 (e.g., a device on the cloud 604) using the instance 608d of the first communication channel, for example, in a non-transformed form or a transformed form other than the first transformed form. In one embodiment, the first shared data sent to the cloud 604 can also include the pair bit.

Similarly, the second companion device 108b can send second shared information or data to the user device 104 using the instance 612b of the second communication channel in a second transformed form (e.g., as a visual pattern or audio signals). The second shared data can include an identifier of the second companion device 108b (e.g., an address of the second companion device 108b, such as an IP address or a MAC address of the second companion device 108b). The second shared data can also include a pair bit (PB) of a particular value (e.g., a value of one), indicating that the second companion device 108b is available for pairing. The second companion device 108b (or another device) can generate the second shared data in the second transformed form. Prior to, at a same time, or after sending the second shared data in the second transformed form to the user device 104, the second companion device 108b can also send the second shared data to the cloud 604 (e.g., a device on the cloud 604) using the instance 608e of the first communication channel, for example, in a non-transformed form or a transformed form other than the second transformed form. In one embodiment, the second shared data sent to the cloud 604 can also include the pair bit. In one embodiment, the process implemented by the first companion device 108a to generate the first shared data in the first transformed form and the process implemented by the second companion device 108b to generate the second shared data in the second transformed form are the same.

After receiving the first shared data in the first transformed form from the first companion device 108a and receiving the second shared data in the second transformed form from the second companion device 108b, the user device 104 can send data including the first shared data in the first transformed form, the second shared data in the second transformed form, and an identifier of the user device 104 (e.g., an address of the user device 104, such as an IP address or a MAC address of the user device 104) to the cloud 604 (e.g., a device on the cloud 604). The device on the cloud 604 receiving the first shared data from the first companion device 108a, the device on the cloud 604 receiving the second shared data from the second companion device 108b, and the device on the cloud 604 receiving data from the user device 104 can be the same device.

The device on the cloud 604 can verify the consistency of the data received from the user device 104 and the companion devices 108a, 108b. For example, the device on the cloud 604 can generate an instance of the first shared data in the first transformed form using the first shared data received from the first companion device 108a. The device on the cloud 604 can verify the first shared data in the first transformed form received from the user device 104 is consistent with the first shared data in the first transformed form it generates. As another example, the device on the cloud 604 can generate an instance of the second shared data in the second transformed form using the second shared data received from the second companion device 108b. The device on the cloud 604 can verify the second shared data in the second transformed form received from the user device 104 is consistent with the second shared data in the second transformed form it generates. In one embodiment, the first shared data includes the identifier of the first companion device 108a, and the second shared data includes the identifier of the second companion device 108b. The device on the cloud 604 can verify the proximity of the companion devices 108a, 108b based on the identifiers (e.g., IP addresses of the devices). In one embodiment, the device on the cloud 604 can verify the proximity of the user device 104 and the companion devices 108a, 108b based on the identifiers (e.g., IP addresses of the devices). After verifying the consistency of the data received, the device on the cloud 604 can authenticate the user device 104 and the companion devices 108a, 108b.

After authenticating the user device 104 and the companion devices 108a, 108b, the device on the cloud 604 can generate a third shared information or data (e.g., a link key) for the user device 104 and the companion devices 108a, 108b to communicate with one another. For example, the device on the cloud 604 can send the third shared data to the first companion device 108a using the instance 608d of the first communication channel. The device on the cloud 604 can send the third shared data to the second companion device 108b using the instance 608e of the first communication channel. The device on the cloud 604 can send the third shared data to the user device 104 using the instance 608a or the instance 608b of the first communication channel. After receiving the third shared data, the user device 104 and the companion devices 108a, 108b can encrypt data for sending to one another or decrypt data received from one another.

Figure 7:
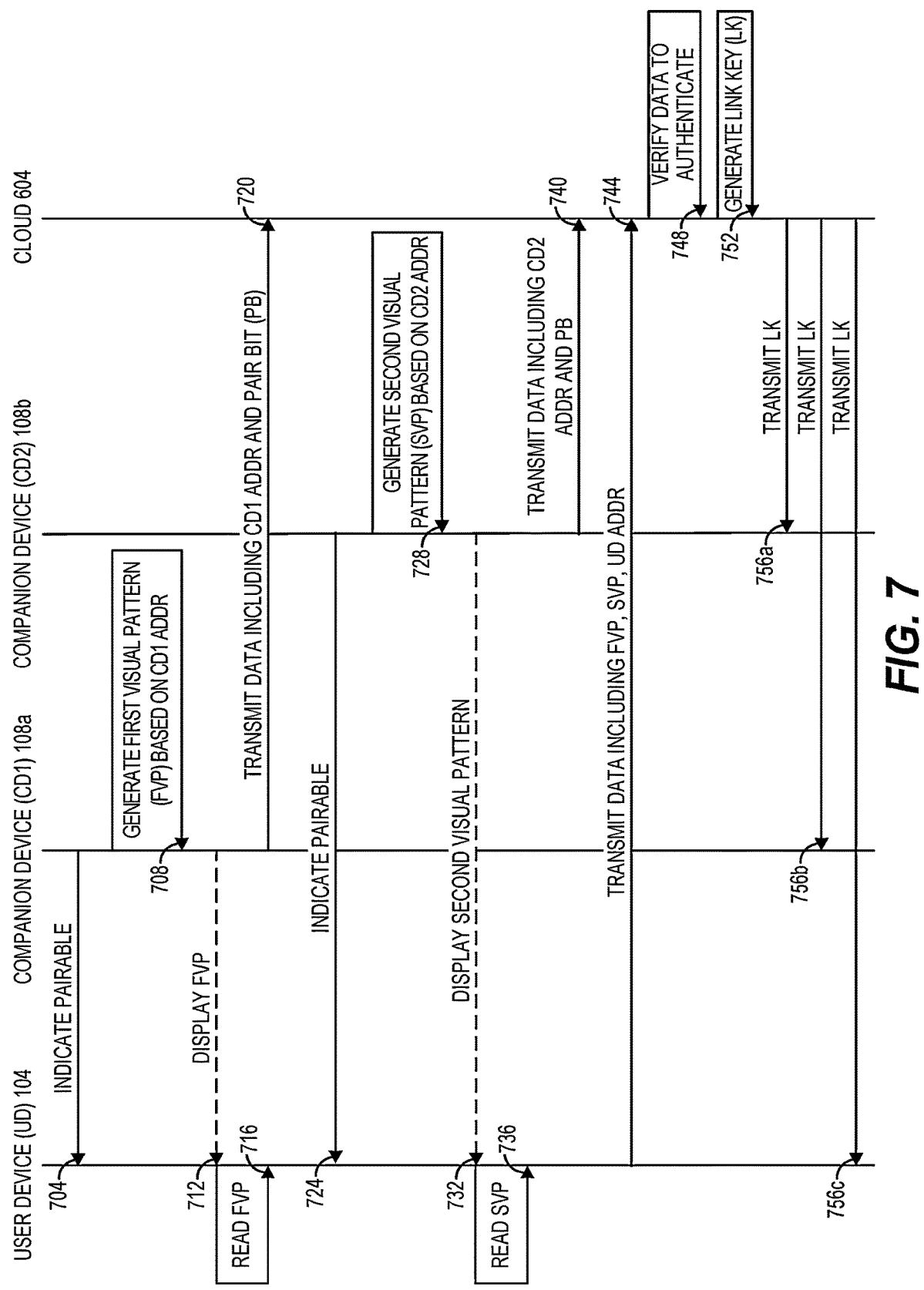
FIG. 7 is an interaction diagram illustrating device authentication between a user device and two companion devices using visual patterns generated by the two companion devices.

Example Device Authentication Using Visual Patterns Generated by Two Companion Devices In some embodiments, a user device 104 and two or more companion devices (e.g., a first companion device 108a and a second companion device 108b) can authenticate or pair with each other using multiple shared information or data. FIG. 7 is an interaction diagram illustrating device authentication between a user device 104 and two companion devices 108a, 108b using visual patterns (or audio signals, or transformations) generated by the two companion devices 108a, 108b. In one embodiment, the first companion device 108a can indicate its pairable status using visual communication (e.g., using its display) or audio communication (e.g., using its speaker) at interaction 704. After receiving the pairable status, the user device 104 can initiate its part of the process of authenticating the first companion device 108a.

The first companion device 108a can generate an information or data object, such as a first visual pattern (FVP), at interaction 708. The first companion device 108a can generate the first visual pattern using an address of the first companion device 108a (e.g., an Internet Protocol (IP) address or a media access control (MAC) address of the first companion device 108a) or an identifier of the first companion device 108a. In one embodiment, the first companion device 108a can include one or more addresses or identifiers. The first companion device 108a can display (or otherwise communicate using non-visual patterns or signals) the first visual pattern at interaction 712. Such a display of the first visual pattern can be referred to as an out-of-band (OOB) communication. The user device 104 can read the first visual pattern (or receive visual or non-visual patterns or signals) at interaction 716. For example, the user device 104 can capture the first visual pattern using an image capture device of the user device 104. After reading the first visual pattern at interaction 716, the user device 104 can store the first visual pattern in its memory. The user device 104 can store the first visual pattern temporarily, for example, until the authentication process is complete.

The first companion device 108a can send data that includes the address of the first companion device 108a and a pair bit (PB) of a particular value (e.g., a value of one), indicating that the first companion device 108a is available for pairing, to the cloud 604 (e.g., a device on the cloud 604) at interaction 720. In one embodiment, the first companion device I08a can transmit data to the device on the cloud 604 at interaction 720 prior to displaying the first visual pattern at interaction 712.

In one embodiment, the second companion device 108b can indicate its pairable status using visual communication (e.g., using its display) or audio communication (e.g., using its speaker) at interaction 724. After receiving the pairable status, the user device 104 can initiate its part of the process of authenticating the second companion device 108b. The second companion device 108b can generate an information or data object, such as a second visual pattern (SVP), at interaction 728. The second companion device 108b can generate the second visual pattern using an address of the second companion device 108b (e.g., an IP address or a MAC address of the second companion device 108b) or an identifier of the second companion device 108b. In one embodiment, the second companion device 108b can include one or more addresses or identifiers.

The second companion device 108b can display (or otherwise communicate using non-visual patterns or signals) the second visual pattern at interaction 732. Such a display of the second visual pattern can be referred to as an out-of-band (OOB) communication. The user device 104 can read the second visual pattern (or receive visual or non-visual patterns or signals) at interaction 736. For example, the user device 104 can capture the second visual pattern using an image capture device of the user device 104. After reading the second visual pattern at interaction 736, the user device 104 can store the second visual pattern in its memory. The user device 104 can store the second visual pattern temporarily, for example, until the authentication process is complete. The second companion device 108b can send data that includes the address of the second companion device 108b and a pair bit (PB) of a particular value, indicating that the second companion device 108b is available for pairing, to the cloud 604 (e.g., a device on the cloud 604) at interaction 740. In one embodiment, the second companion device 108b can transmit data to the device on the cloud 604 at interaction 740 prior to displaying the second visual pattern at interaction 732. In one embodiment, the process implemented by the first companion device 108a to generate the first visual pattern and the process implemented by the second companion device 108b to generate the second visual pattern are the same.

After reading the first visual pattern displayed by the first companion device 108a and the second visual pattern displayed by the second companion device 108b, the user device 104 can send data including the first visual pattern, the second visual pattern, and an address or an identifier of the user device 104 (e.g., an IP address or a MAC address of the user device 104) to the cloud 604 (e.g., a device on the cloud 604) at interaction 744. The device on the cloud 604 receiving the data from the first companion device 108a, the device on the cloud 604 receiving the data from the second companion device 108b, and the device on the cloud 604 receiving data from the user device 104 can be the same device on the cloud 604.

The device on the cloud 604 can verify the consistency of the data received from the user device 104 and the companion devices 108a, 108b at interaction 748. For example, the device on the cloud 604 can generate the first visual pattern using the address of the first companion device 108a received from the first companion device 108a after interaction 720. The device on the cloud 604 can verify the first visual pattern received from the user device 104 after interaction 744 is consistent with the first visual pattern it generates. As another example, the device on the cloud 604 can receive the first visual pattern from the first companion device 108a at interaction 720. The device on the cloud 604 can verify the first visual pattern received from the user device 104 after interaction 744 is consistent with the first visual pattern received from the first companion device 108a after interaction 720.

The device on the cloud 604 can generate the second visual pattern using the address of the second companion device 108b received from the second companion device 108b after interaction 740. The device on the cloud 604 can verify the second visual pattern received from the user device 104 after interaction 744 is consistent with the second visual pattern it generates. As another example, the device on the cloud 604 can receive the second visual pattern from the second companion device 108b at interaction 740. The device on the cloud 604 can verify the second visual pattern received from the user device 104 after interaction 744 is consistent with the second visual pattern received from the second companion device 108b after interaction 740.

After authenticating the user device 104 and the companion devices 108a, 108b, the device on the cloud 604 can generate a link key (LK) at interaction 752. The user device 104 and the companion devices 108a, 108b can use the link key to communicate with one another securely. The device on the cloud 604 can send the link key to the second companion device 108b at interaction 756a. The device on the cloud 604 can send the link key to the first companion device 108a at interaction 756b. The device on the cloud 604 can send the link key to the user device 104 at interaction 756c. After receiving the link key, the user device 104 and the companion devices 108a, 108b can encrypt data for sending to one another or decrypt data received from one another using the link key. In one embodiment, some of the interactions described above can be repeated at a regular interval (e.g., every second, minute, hour, or more) so that new link keys are generated. Accordingly, the user device

104 and the companion devices 108a, 108b can communicate with each other securely using the new link keys.

Figure 8:
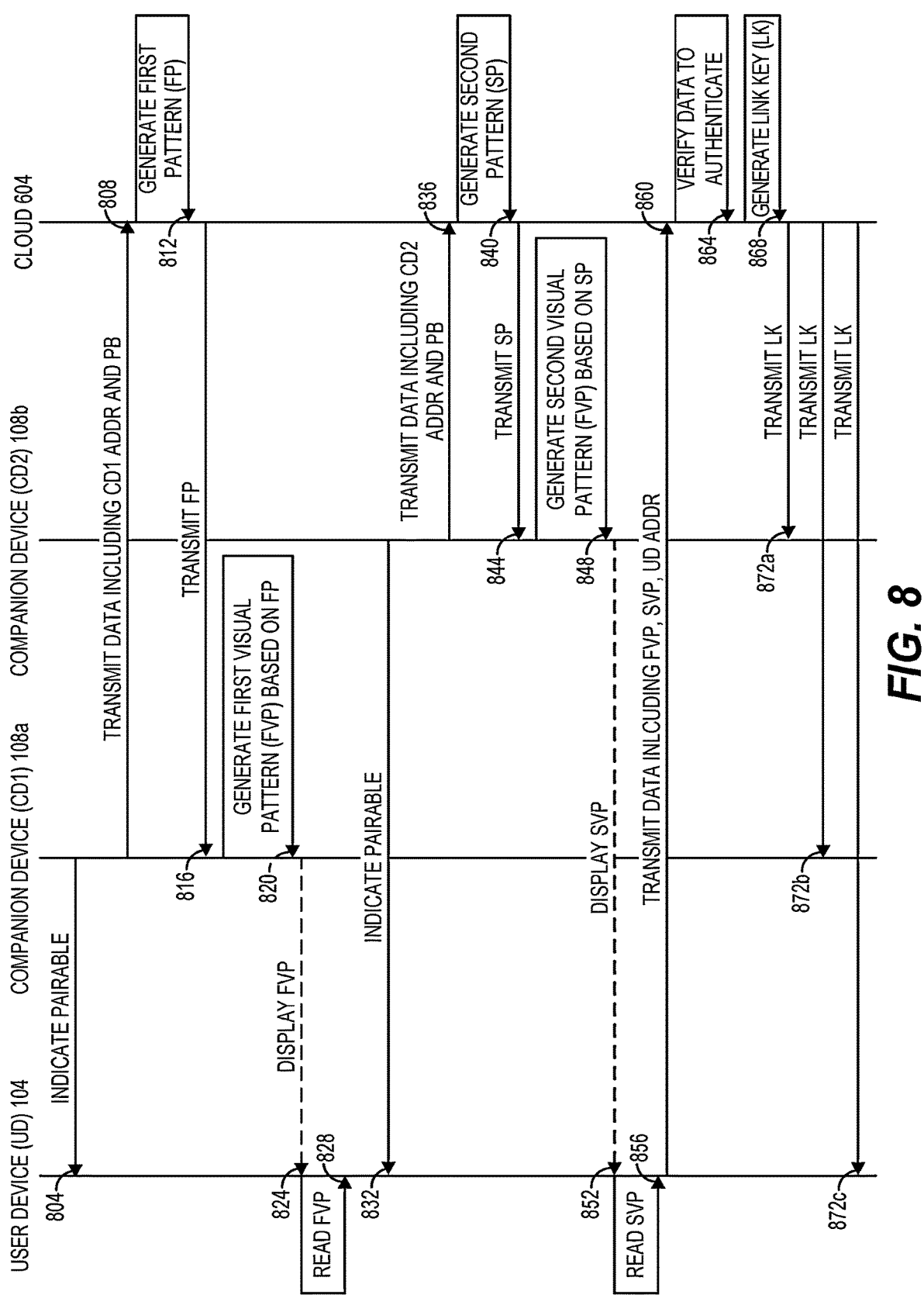
FIG. 8 is an interaction diagram illustrating device authentication between a user device and two companion devices using visual patterns generated, at least in part, by one or more devices on the cloud.

Example Device Authentication Using Visual Patterns Generated by One or More Devices on the Cloud In some embodiments, a user device 104 and two or more companion devices (e.g., a first companion device 108a and a second companion device 108b) can authenticate or pair with each other using multiple shared information or data, generated in part by a device on a cloud 604. FIG. 8 is an interaction diagram illustrating device authentication between a user device 104 and two companion devices 108a, 108b using visual patterns generated, at least in part, by the cloud 604 (e.g., one or more devices on the cloud 604). In one embodiment, the first companion device 108a can indicate its pairable status using visual communication (e.g., using its display) or audio communication (e.g., using its speaker) at interaction 804. After receiving the pairable status, the user device 104 can initiate its part of the process of authenticating the first companion device 108a.

The first companion device 108a can send data that includes the address of the first companion device 108a and a pair bit (PB) of a particular value (e.g., a value of one), indicating that the first companion device 108a is available for pairing, to the cloud 604 (e.g., a device on the cloud 604) at interaction 808. After receiving the address of the first companion device 108a and the pair bit, the device on the cloud 604 can generate a first pattern (FP) at interaction 812. In one embodiment, the device on the cloud 604 can generate the first pattern using the address of the first companion device 108a. For example, the first pattern may be a hash (e.g., secure hash algorithm (SHA)-2) of the address of the first companion device 108a. The device on the cloud 604 can transmit the first pattern to the first companion device 108a at interaction 816.

The first companion device 108a can generate an information or data object, such as a first visual pattern (FVP), at interaction 820. The first companion device 108a can generate the first visual pattern using the received first pattern. In one embodiment, the first companion device 108a can communicate the first visual pattern using an out-of-band (OOB) communication channel. For example, first companion device 108a can display (or otherwise communicate using non-visual patterns or signals) the first visual pattern at interaction 824. The user device 104 can read the first visual pattern (or receive visual or non-visual patterns or signals corresponding to the first visual pattern) at interaction 828. For example, the user device 104 can capture the first visual pattern using an image capture device of the user device 104. After reading the first visual pattern at interaction 824, the user device 104 can store the first visual pattern in its memory. The user device 104 can store the first visual pattern temporarily, for example, until the authentication process is complete.

In one embodiment, the second companion device 108b can indicate its pairable status using visual communication (e.g., using its display) or audio communication (e.g., using its speaker) at interaction 832. After receiving the pairable status, the user device 104 can initiate its part of the process of authenticating the second companion device 108b. The second companion device 108b can send data that includes the address of the second companion device 108b and a pair bit (PB) of a particular value, indicating that the second companion device 108b is available for pairing, to the cloud 604 (e.g., a device on the cloud 604) at interaction 836. After receiving the address of the second companion device 108b and the pair bit, the device on the cloud 604 can generate a second pattern (SP) at interaction 840. In one embodiment, the device on the cloud 604 can generate the second pattern using the address of the second companion device 108b. For example, the second pattern may be a hash (e.g., secure hash algorithm (SHA)-2) of the address of the second companion device 108b. The device on the cloud 604 can transmit the second pattern to the second companion device 108b at interaction 844.

The second companion device 108b can generate an information or data object, such as a second visual pattern (SVP), at interaction 848. The second companion device 108a can generate the second visual pattern using the received second pattern. In one embodiment, the second companion device 108b can communicate the second visual pattern using an out-of-band (OOB) communication channel. For example, the second companion device 108b can display (or otherwise communicate using non-visual patterns or signals) the second visual pattern at interaction 852. The user device 104 can read the second visual pattern (or receive visual or non-visual patterns or signals corresponding to the second visual pattern) at interaction 856. For example, the user device 104 can capture the second visual pattern using an image capture device of the user device 104. After reading the second visual pattern at interaction 856, the user device 104 can store the second visual pattern in its memory. The user device 104 can store the second visual pattern temporarily, for example, until the authentication process is complete.

After reading the first visual pattern displayed by the first companion device 108a at interaction 824 and the second visual pattern displayed by the second companion device 108b at interaction 852, the user device 104 can send data including the first visual pattern, the second visual pattern, and an address or an identifier of the user device 104 (e.g., an IP address or a MAC address of the user device 104) to the cloud 604 (e.g., a device on the cloud 604) at interaction 856. The device on the cloud 604 receiving the data from the first companion device 108a, the device on the cloud 604 receiving the data from the second companion device 108b, and the device on the cloud 604 receiving data from the user device 104 can be the same device on the cloud 604.

The device on the cloud 604 can verify the consistency of the data received from the user device 104 and the companion devices 108a, 108b at interaction 864. For example, the device on the cloud 604 can generate the first visual pattern using the first pattern it generates. The device on the cloud 604 can verify the first visual pattern received from the user device 104 is consistent with the first visual pattern it generates. The device on the cloud 604 can generate the second visual pattern using the using the second pattern it generates. The device on the cloud 604 can verify the second visual pattern received from the user device 104 is consistent with the second visual pattern it generates.

After authenticating the user device 104 and the companion devices 108a, 108b, the device on the cloud 604 can generate a link key (LK) at interaction 868. The user device 104 and the companion devices 108a, 108b can use the link key to communicate with one another securely. The device on the cloud 604 can send the link key to the second companion device 108b at interaction 872a. The device on the cloud 604 can send the link key to the first companion device 108a at interaction 872b. The device on the cloud 604 can send the link key to the user device 104 at interaction 872c. After receiving the link key, the user device 104 and the companion devices 108a, 108b can encrypt data for sending to one another or decrypt data received from one another using the link key. In one embodiment, some of the interactions described above can be repeated at a regular interval (e.g., every second, minute, hour, or more) so that new link keys are generated. Accordingly, the user device 104 and the companion devices 108a, 108b can communicate with each other securely using the new link keys.

Example Augmented Reality Scenario

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality "VR" scenario typically involves presentation of digital or virtual image information without transparency to other actual real-world visual input; an augmented reality "AR" scenario typically involves presentation of digital or virtual image information as an augmentation to visualization of the actual world around the user; or a mixed reality "MR" scenario that typically involves merging real and virtual worlds to produce new environment where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR, and MR technology.

Figure 9:
FIG. 9 depicts an illustration of an augmented reality scenario with certain virtual reality objects, and certain actual reality objects viewed by a person, according to one embodiment.

FIG. 9 depicts an illustration of an augmented reality scenario with certain virtual reality objects, and certain actual reality objects viewed by a person. FIG. 9 depicts an augmented reality scene 900, wherein a user of an AR technology sees a real-world park-like setting 910 featuring people, trees, buildings in the background, and a concrete platform 920. In addition to these items, the user of the AR technology also perceives that he "sees" a robot statue 930 standing upon the real-world platform 920, and a cartoon-like avatar character 940 (e.g., a bumble bee) flying by which seems to be a personification of a bumble bee, even though these elements do not exist in the real world.

In order for a three-dimensional (3-D) display to produce a true sensation of depth, and more specifically, a simulated sensation of surface depth, it is desirable for each point in the display's visual field to generate the accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane and/or based on observing different image features on different depth planes being out of focus. As discussed elsewhere herein, such depth cues provide credible perceptions of depth. To produce or enhance VR, AR, and MR experiences, display systems can use biometric information to enhance those experiences.

Example Wearable Display System

Figure 10:
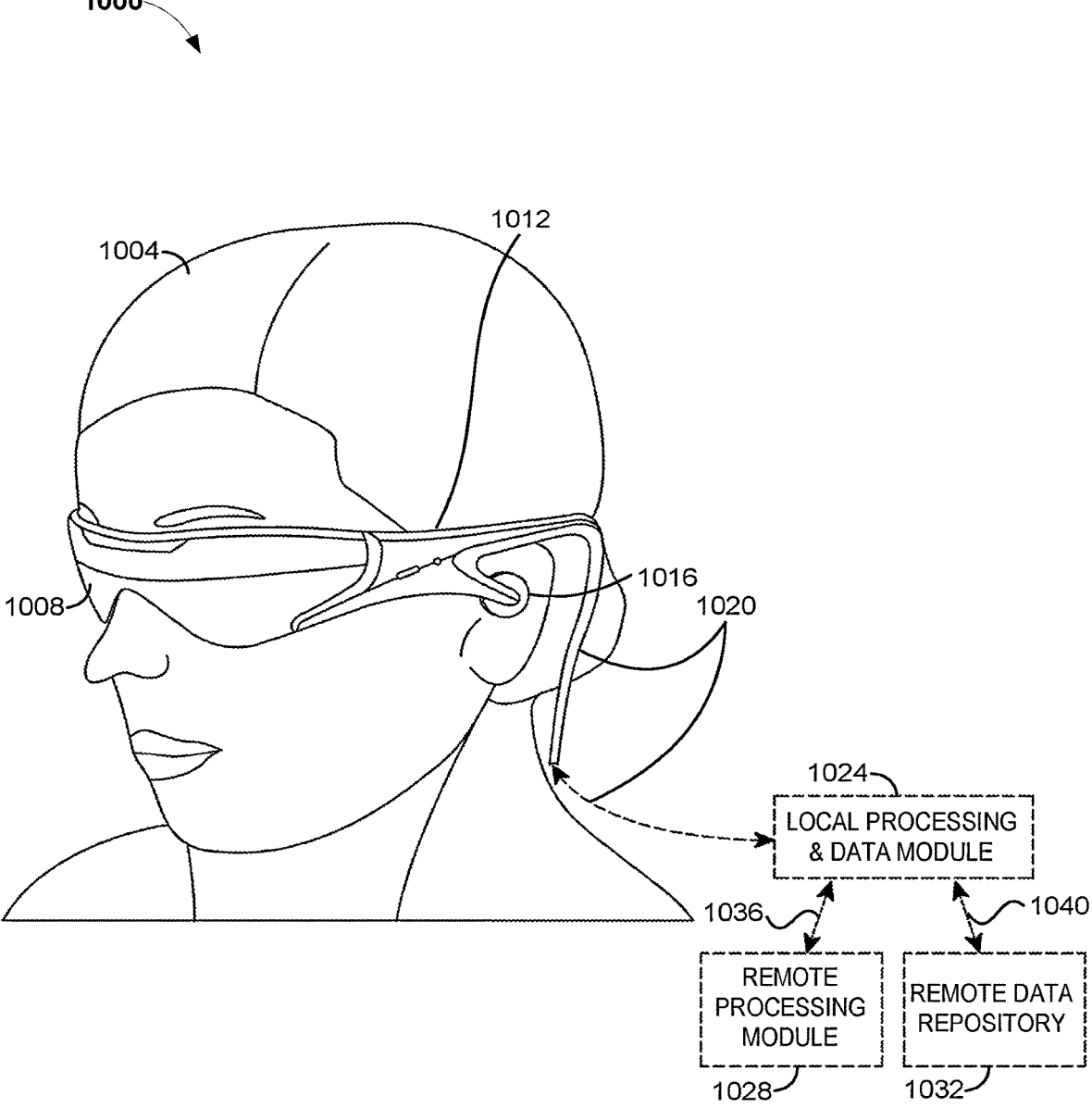
FIG. 10 illustrates an example of a wearable display system, according to one embodiment.

FIG. 10 illustrates an example of a wearable display system 1000 that can be used to present a VR, AR, or MR experience to a display system wearer or viewer 1004. The wearable display system 1000 may be programmed to perform any of the applications or embodiments described herein. The display system 1000 includes a display 1008, and various mechanical and electronic modules and systems to support the functioning of the display 1008. The display 1008 may be coupled to a frame 1012, which is wearable by a display system user, wearer, or viewer 1004 and which is configured to position the display 1008 in front of the eyes of the wearer 1004. The display 1008 may be a light field display. In some embodiments, a speaker 1016 is coupled to the frame 1012 and positioned adjacent the ear canal of the user. In some embodiments, another speaker, not shown, is positioned adjacent the other ear canal of the user to provide for stereo/shapeable sound control. The display 1008 is operatively coupled 1020, such as by a wired lead or wireless connectivity, to a local data processing module 1024 which may be mounted in a variety of configurations, such as fixedly attached to the frame 1012, fixedly attached to a helmet or hat worn by the user, embedded in headphones, or otherwise removably attached to the user 1004 (e.g., in a backpack-style configuration, in a belt-coupling style configuration).

The frame 1012 can have one or more cameras attached or mounted to the frame 1012 to obtain images of the wearer's eye(s). In one embodiment, the camera(s) may be mounted to the frame 1012 in front of a wearer's eye so that the eye can be imaged directly. In other embodiments, the camera can be mounted along a stem of the frame 1012 (e.g., near the wearer's ear). In such embodiments, the display 1008 may be coated with a material that reflects light from the wearer's eye back toward the camera. The light may be infrared light, since iris features are prominent in infrared images.

The local processing and data module 1024 may comprise a hardware processor, as well as non-transitory digital memory, such as non-volatile memory (e.g., flash memory), both of which may be utilized to assist in the processing, caching, and storage of data. The data may include data (a) captured from sensors (which may be, e.g., operatively coupled to the frame 1012 or otherwise attached to the user 1004), such as image capture devices (such as cameras), microphones, inertial measurement units, accelerometers, compasses, GPS units, radio devices, and/or gyros; and/or (b) acquired and/or processed using remote processing module 1028 and/or remote data repository 1032, possibly for passage to the display 1008 after such processing or retrieval. The local processing and data module 1024 may be operatively coupled to the remote processing module 1028 and remote data repository 1032 by communication links 1036 and/or 1040, such as via wired or wireless communication links, such that these remote modules 1028, 1032 are available as resources to the local processing and data module 1024. The image capture device(s) can be used to capture the eye images used in the eye image processing procedures. In addition, the remote processing module 1028 and remote data repository 1032 may be operatively coupled to each other.

In some embodiments, the remote processing module 1028 may comprise one or more processors configured to analyze and process data and/or image information such as video information captured by an image capture device. The video data may be stored locally in the local processing and data module 1024 and/or in the remote data repository 1032. In some embodiments, the remote data repository 1032 may comprise a digital data storage facility, which may be available through the internet or other networking configuration in a "cloud" resource configuration. In some embodiments, all data is stored and all computations are performed in the local processing and data module 1024, allowing fully autonomous use from a remote module.

In some implementations, the local processing and data module 1024 and/or the remote processing module 1028 are programmed to perform embodiments of systems and methods as described herein. The image capture device can capture video for a particular application (e.g., video of the wearer's eye for an eye-tracking application or video of a wearer's hand or finger for a gesture identification application). The video can be analyzed by one or both of the processing modules 1024, 1028. In some cases, off-loading at least some of the iris code generation to a remote processing module (e.g., in the "cloud") may improve efficiency or speed of the computations. The parameters of the systems and methods disclosed herein can be stored in data modules 1024 and/or 1028.

The results of the analysis can be used by one or both of the processing modules 1024, 1028 for additional operations or processing. For example, in various applications, biometric identification, eye-tracking, recognition, or classification of gestures, objects, poses, etc. may be used by the wearable display system 1000. For example, the wearable display system 1000 may analyze video captured of a hand of the wearer 1004 and recognize a gesture by the wearer's hand (e.g., picking up a real or virtual object, signaling assent or dissent (e.g., "thumbs up", or "thumbs down"), etc.), and the wearable display system.

The human visual system is complicated and providing a realistic perception of depth is challenging. Without being limited by theory, it is believed that viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic or comfortable simulations of three-dimensional imagery.

Figure 11:
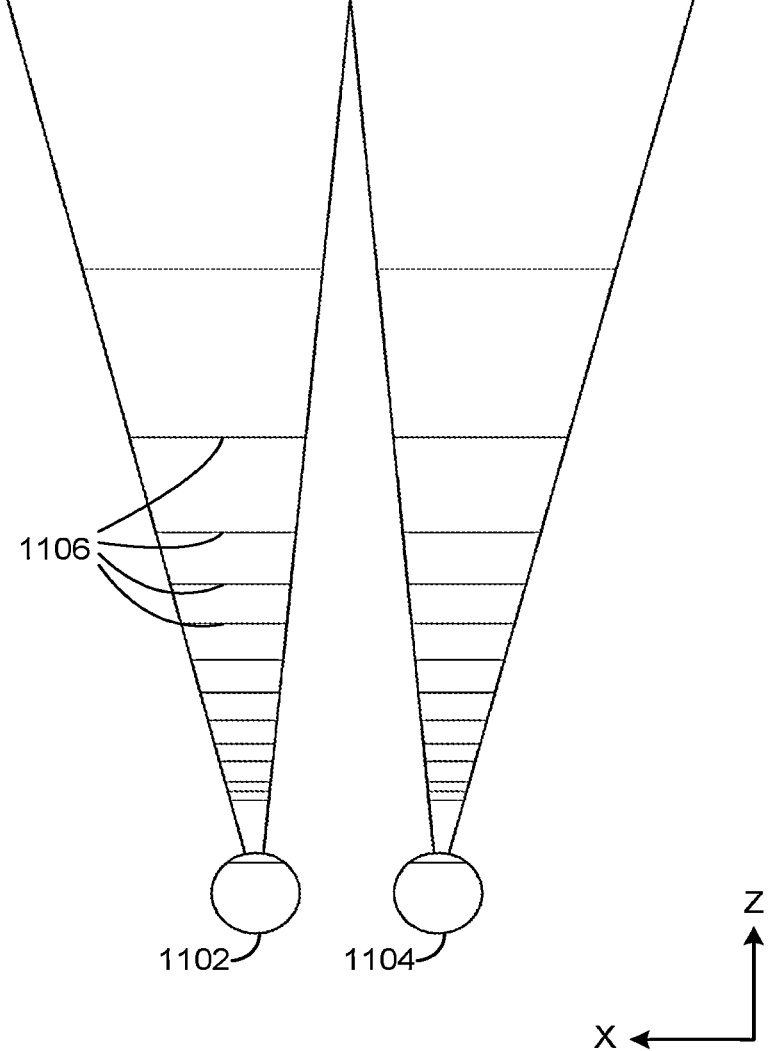
FIG. 11 illustrates aspects of an approach for simulating three-dimensional imagery using multiple depth planes, according to one embodiment.

FIG. 11 illustrates aspects of an approach for simulating three-dimensional imagery using multiple depth planes. With reference to FIG. 11, objects at various distances from eyes 1102 and 1104 on the z-axis are accommodated by the eyes 1102 and 1104 so that those objects are in focus. The eyes 1102 and 1104 assume particular accommodated states to bring into focus objects at different distances along the z-axis. Consequently, a particular accommodated state may be said to be associated with a particular one of depth planes

1106, with an associated focal distance, such that objects or parts of objects in a particular depth plane are in focus when the eye is in the accommodated state for that depth plane. In some embodiments, three-dimensional imagery may be simulated by providing different presentations of an image for each of the eyes 1102 and 1104, and also by providing different presentations of the image corresponding to each of the depth planes. While shown as being separate for clarity of illustration, it will be appreciated that the fields of view of the eyes 1102 and 1104 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Example Waveguide Stack Assembly

Figure 12:
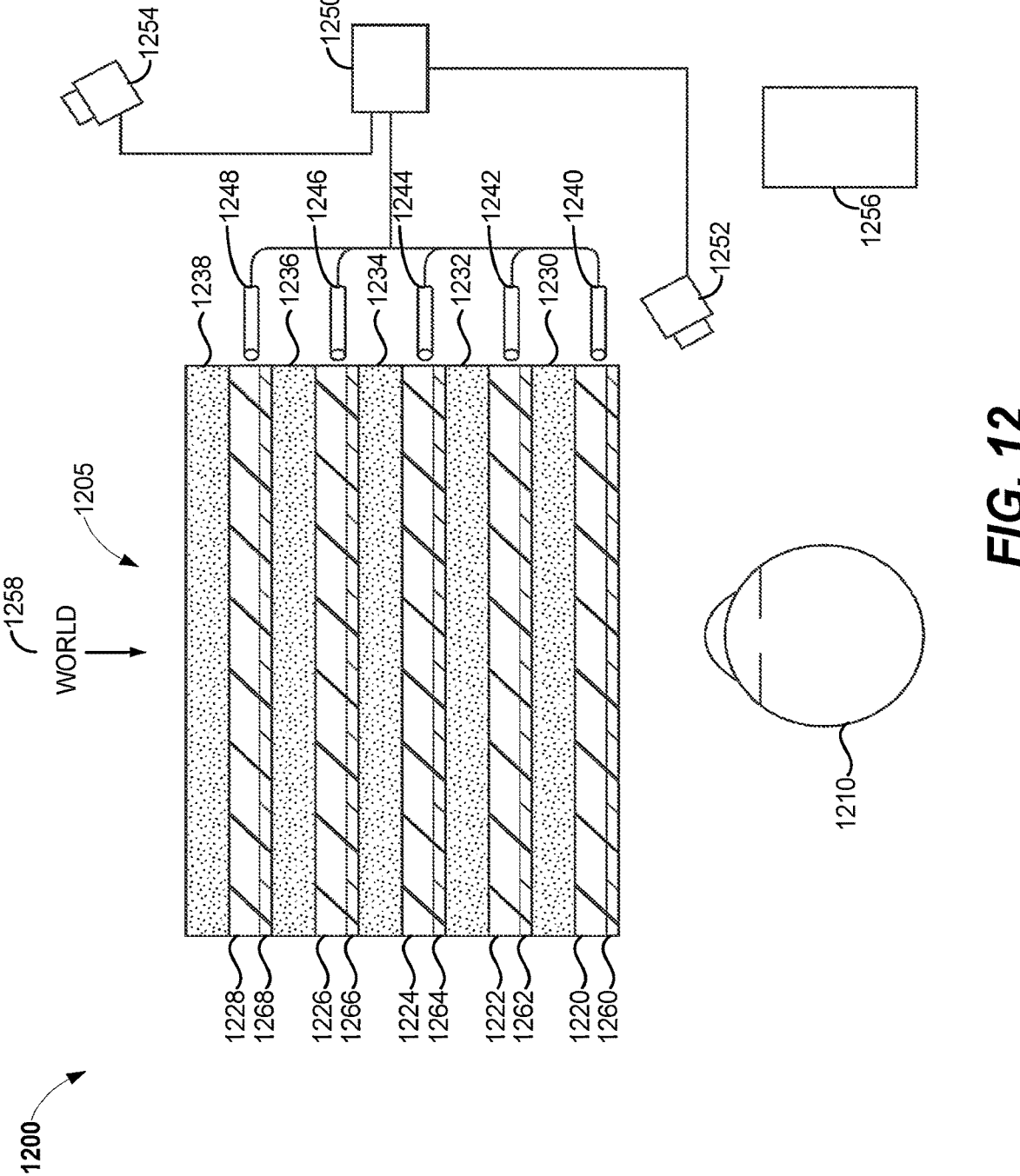
FIG. 12 illustrates an example of a waveguide stack for outputting image information or data to a user, according to one embodiment.

FIG. 12 illustrates an example of a waveguide stack for outputting image information to a user. A display system 1200 includes a stack of waveguides, or stacked waveguide assembly 1205 that may be utilized to provide three-dimensional perception to the eye 1210 or brain using a plurality of waveguides 1220, 1222, 1224, 1226, 1228. In some embodiments, the display system 1200 may correspond to system 1000 of FIG. 10, with FIG. 12 schematically showing some parts of that system 1000 in greater detail. For example, in some embodiments, the waveguide assembly 1205 may be integrated into the display 1008 of FIG. 10.

With continued reference to FIG. 12, the waveguide assembly 1205 may also include a plurality of features 1230, 1232, 1234, 1236 between the waveguides. In some embodiments, the features 1230, 1232, 1234, 1236 may be lenses. In some embodiments, the features 1230, 1232, 1234, 1236 may not be lenses. Rather, they may be spacers (e.g., cladding layers and/or structures for forming air gaps).

The waveguides 1220, 1222, 1224, 1226, 1228 and/or the plurality of lenses 1230, 1232, 1234, 1236 may be configured to send image information to the eye with various levels of wavefront curvature or light ray divergence. Each waveguide level may be associated with a particular depth plane and may be configured to output image information corresponding to that depth plane. Image injection devices 1240, 1242, 1244, 1246, 1248 may be utilized to inject image information into the waveguides 1220, 1222, 1224, 1226, 1228, each of which may be configured to distribute incoming light across each respective waveguide, for output toward the eye 1210. Light exits an output surface of the image injection devices 1240, 1242, 1244, 1246, 1248 and is injected into a corresponding input edge of the waveguides 1220, 1222, 1224, 1226, 1228. In some embodiments, a single beam of light (e.g., a collimated beam) may be injected into each waveguide to output an entire field of cloned collimated beams that are directed toward the eye 1210 at particular angles (and amounts of divergence) corresponding to the depth plane associated with a particular waveguide.

In some embodiments, the image injection devices 1240, 1242, 1244, 1246, 1242 are discrete displays that each produce image information for injection into a corresponding waveguide 1220, 1222, 1224, 1226, 1228, respectively.

In some other embodiments, the image injection devices 1240, 1242, 1246, 1246, 1248 are the output ends of a single multiplexed display which may, for example, pipe image information via one or more optical conduits (such as fiber optic cables) to each of the image injection devices 1240, 1242, 1244, 1246, 1248.

A controller 1250 controls the operation of the stacked waveguide assembly 1205 and the image injection devices 1240, 1242, 1244, 1246, 1248. In some embodiments, the controller 1250 includes programming (e.g., instructions in a non-transitory computer-readable medium) that regulates the timing and provision of image information to the waveguides 1220, 1222, 1224, 1226, 1228. In some embodiments, the controller 1250 may be a single integral device, or a distributed system connected by wired or wireless communication channels. The controller 1250 may be part of the processing modules 1024 or 1028 (illustrated in FIG. 10) in some embodiments. In some embodiments, the controller may be in communication with an inward-facing imaging system 1252 (e.g., a digital camera), an outward-facing imaging system 1254 (e.g., a digital camera), and/or a user input device 1266. The inward-facing imaging system 1252 (e.g., a digital camera) can be used to capture images of the eye 1210 to, for example, determine the size and/or orientation of the pupil of the eye 1210. The outward-facing imaging system 1254 can be used to image a portion of the world 1256. The user can input commands to the controller 1250 via the user input device 1266 to interact with the display system 1200.

The waveguides 1220, 1222, 1224, 1226, 1228 may be configured to propagate light within each respective waveguide by total internal reflection (TIR). The waveguides 1220, 1222, 1224, 1226, 1228 may each be planar or have another shape (e.g., curved), with major top and bottom surfaces and edges extending between those major top and bottom surfaces. In the illustrated configuration, the waveguides 1220, 1222, 1224, 1226, 1228 may each include light extracting optical elements 1260, 1262, 1264, 1266, 1268 that are configured to extract light out of a waveguide by redirecting the light, propagating within each respective waveguide, out of the waveguide to output image information to the eye 1210. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (1260, 1262, 1264, 1266, 1268 may, for example, be reflective and/or diffractive optical features. While illustrated disposed at the bottom major surfaces of the waveguides 1220, 1222, 1224, 1226, 1228 for ease of description and drawing clarity, in some embodiments, the light extracting optical elements 1260, 1262, 1264, 1266, 1268 may be disposed at the top and/or bottom major surfaces, and/or may be disposed directly in the volume of the waveguides 1220, 1222, 1224, 1226, 1228. In some embodiments, the light extracting optical elements 1260, 1262, 1264, 1266, 1268 may be formed in a layer of material that is attached to a transparent substrate to form the waveguides 1220, 1222, 1224, 1226, 1228. In some other embodiments, the waveguides 1220, 1222, 1224, 1226, 1228 may be a monolithic piece of material and the light extracting optical elements 1260, 1262, 1264, 1266, 1268 may be formed on a surface and/or in the interior of that piece of material.

With continued reference to FIG. 12, as discussed herein, each waveguide 1220, 1222, 1224, 1226, 1228 is configured to output light to form an image corresponding to a particular depth plane. For example, the waveguide 1220 nearest the eye may be configured to deliver collimated light, as injected into such waveguide 1220, to the eye 1210. The collimated light may be representative of the optical infinity focal plane. The next waveguide up 1222 may be configured to send out collimated light which passes through the first lens 1230 (e.g., a negative lens) before it can reach the eye 1210. First lens 1230 may be configured to create a slight convex wavefront curvature so that the eye/brain interprets light coming from that next waveguide up 1222 as coming from a first focal plane closer inward toward the eye 1210 from optical infinity. Similarly, the third up waveguide 1224 passes its output light through both the first lens 1230 and second lens 1232 before reaching the eye 1210. The combined optical power of the first and second lenses 1230 and 1232 may be configured to create another incremental amount of wavefront curvature so that the eye/brain interprets light coming from the third waveguide 1224 as coming from a second focal plane that is even closer inward toward the person from optical infinity than is light from the next waveguide up 1222.

The other waveguide layers (e.g., waveguides 1226, 1228) and lenses (e.g., lenses 1234, 1236) are similarly configured, with the highest waveguide 1228 in the stack sending its output through all of the lenses between it and the eye for an aggregate focal power representative of the closest focal plane to the person. To compensate for the stack of lenses 1230, 1232, 1234, 1236 when viewing/interpreting light coming from the world 1256 on the other side of the stacked waveguide assembly 1205, a compensating lens layer 1238 may be disposed at the top of the stack to compensate for the aggregate power of the lens stack 1230, 1232, 1234, 1236 below. Such a configuration provides as many perceived focal planes as there are available waveguide/lens pairings. Both the light extracting optical elements 1260, 1262, 1264, 1266, 1268 of the waveguides 1220, 1222, 1224, 1226, 1228 and the focusing aspects of the lenses 1230, 1232, 1234, 1236 may be static (e.g., not dynamic or electro-active). In some alternative embodiments, either or both may be dynamic using electro-active features.

With continued reference to FIG. 12, the light extracting optical elements 1260, 1262, 1264, 1266, 1268 may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 1260, 1262, 1264, 1266, 1268 may be volumetric or surface features, which may be configured to output light at specific angles. For example, the light extracting optical elements 1260, 1262, 1264, 1266, 1268 may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety. In some embodiments, the features 1230, 1232, 1234, 1236, 1238 may not be lenses. Rather, they may simply be spacers (e.g., cladding layers and/or structures for forming air gaps).

In some embodiments, the light extracting optical elements 1260, 1262, 1264, 1266, 1268 are diffractive features that form a diffraction pattern, or "diffractive optical element" (also referred to herein as a "DOE"). Preferably, the DOEs have a relatively low diffraction efficiency so that only a portion of the light of the beam is deflected away toward the eye 1210 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 1210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes and/or depth of field may be varied dynamically based on the pupil sizes and/or orientations of the eyes of the viewer. In some embodiments, an inward-facing imaging system 1252 (e.g., a digital camera) may be used to capture images of the eye 1210 to determine the size and/or orientation of the pupil of the eye 1210. In some embodiments, the inward-facing imaging system 1252 may be attached to the frame 1012 (as illustrated in FIG. 10) and may be in electrical communication with the processing modules 1024 and/or 1028, which may process image information from the inward-facing imaging system 1252) to determine, e.g., the pupil diameters, or orientations of the eyes of the user 1004.

In some embodiments, the inward-facing imaging system 1252 (e.g., a digital camera) can observe the movements of the user, such as the eye movements and the facial movements. The inward-facing imaging system 1252 may be used to capture images of the eye 1210 to determine the size and/or orientation of the pupil of the eye 1210. The inward-facing imaging system 1252 can be used to obtain images for use in determining the direction the user is looking (e.g., eye pose) or for biometric identification of the user (e.g., via iris identification). The images obtained by the inward-facing imaging system 1252 may be analyzed to determine the user's eye pose and/or mood, which can be used by the display system 1200 to decide which audio or visual content should be presented to the user. The display system 1200 may also determine head pose (e.g., head position or head orientation) using sensors such as inertial measurement units (IMUs), accelerometers, gyroscopes, etc. The head's pose may be used alone or in combination with eye pose to interact with stem tracks and/or present audio content.

In some embodiments, one camera may be utilized for each eye, to separately determine the pupil size and/or orientation of each eye, thereby allowing the presentation of image information to each eye to be dynamically tailored to that eye. In some embodiments, at least one camera may be utilized for each eye, to separately determine the pupil size and/or eye pose of each eye independently, thereby allowing the presentation of image information to each eye to be dynamically tailored to that eye. In some other embodiments, the pupil diameter and/or orientation of only a single eye 1210 (e.g., using only a single camera per pair of eyes) is determined and assumed to be similar for both eyes of the viewer 1004.

For example, depth of field may change inversely with a viewer's pupil size. As a result, as the sizes of the pupils of the viewer's eyes decrease, the depth of field increases such that one plane not discernible because the location of that plane is beyond the depth of focus of the eye may become discernible and appear more in focus with reduction of pupil size and commensurate increase in depth of field. Likewise, the number of spaced apart depth planes used to present different images to the viewer may be decreased with decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size and/or orientation, or upon receiving electrical signals indicative of particular pupil sizes and/or orientations. For example, if the user's eyes are unable to distinguish between two depth planes associated with two waveguides, then the controller 1250 may be configured or programmed to cease providing image information to one of these waveguides. Advantageously, this may reduce the processing burden on the system, thereby increasing the responsiveness of the system. In embodiments in which the DOEs for a waveguide are switchable between on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The display system 1200 can include an outward-facing imaging system 1254 (e.g., a digital camera) that images a portion of the world 1256. This portion of the world 1256 may be referred to as the field of view (FOV) and the imaging system 1254 is sometimes referred to as an FOV camera. The entire region available for viewing or imaging by a viewer 1004 may be referred to as the field of regard (FOR). The FOR may include 4n steradians of solid angle surrounding the display system 1200. In some implementations of the display system 1200, the FOR may include substantially all of the solid angle around a user 1004 of the display system 1200, because the user 1004 can move their head and eyes to look at objects surrounding the user (in front, in back, above, below, or on the sides of the user). Images obtained from the outward-facing imaging system 1254 can be used to track gestures made by the user (e.g., hand or finger gestures), detect objects in the world 1256 in front of the user, and so forth.

The display system 1200 can include a user input device 1266 by which the user can input commands to the controller 1250 to interact with the display system 400. For example, the user input device 1266 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. In some cases, the user may use a finger (e.g., a thumb) to press or swipe on a touch-sensitive input device to provide input to the display system 1200 (e.g., to provide user input to a user interface provided by the display system 1200). The user input device 1266 may be held by the user's hand during the use of the display system 1200. The user input device 1266 can be in wired or wireless communication with the display system 1200.

Figure 13:
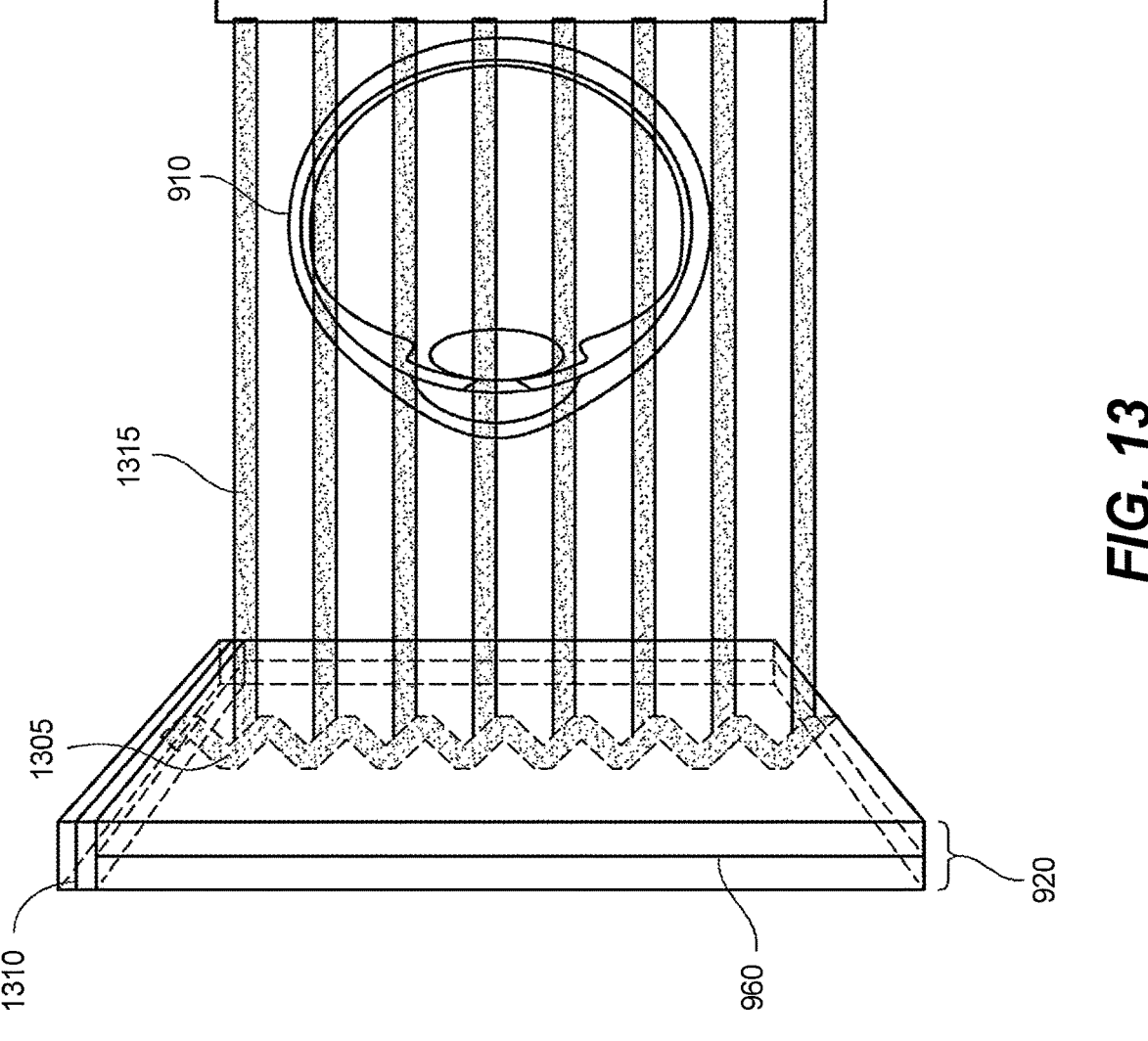
FIG. 13 shows example exit beams that may be outputted by a waveguide, according to one embodiment.

FIG. 13 shows an example of exit beams outputted by a waveguide. One waveguide is illustrated, but it will be appreciated that other waveguides in the waveguide assembly 1205 may function similarly, where the waveguide assembly 1205 includes multiple waveguides. Light 1305 is injected into the waveguide 1220 at the input edge 1310 of the waveguide 1220 and propagates within the waveguide 1220 by total internal reflection (TIR). At points where the light 1305 impinges on the diffractive optical element (DOE) 1260, a portion of the light exits the waveguide as exit beams 1315. The exit beams 1315 are illustrated as substantially parallel but they may also be redirected to propagate to the eye 1210 at an angle (e.g., forming divergent exit beams), depending on the depth plane associated with the waveguide 1220. It will be appreciated that substantially parallel exit beams may be indicative of a waveguide with light extracting optical elements that outcouple light to form images that appear to be set on a depth plane at a large distance (e.g., optical infinity) from the eye 1210. Other waveguides or other sets of light extracting optical elements may output an exit beam pattern that is more divergent, which would require the eye 1210 to accommodate to a closer distance to bring it into focus on the retina and would be interpreted by the brain as light from a distance closer to the eye 1210 than optical infinity.

Figure 14:
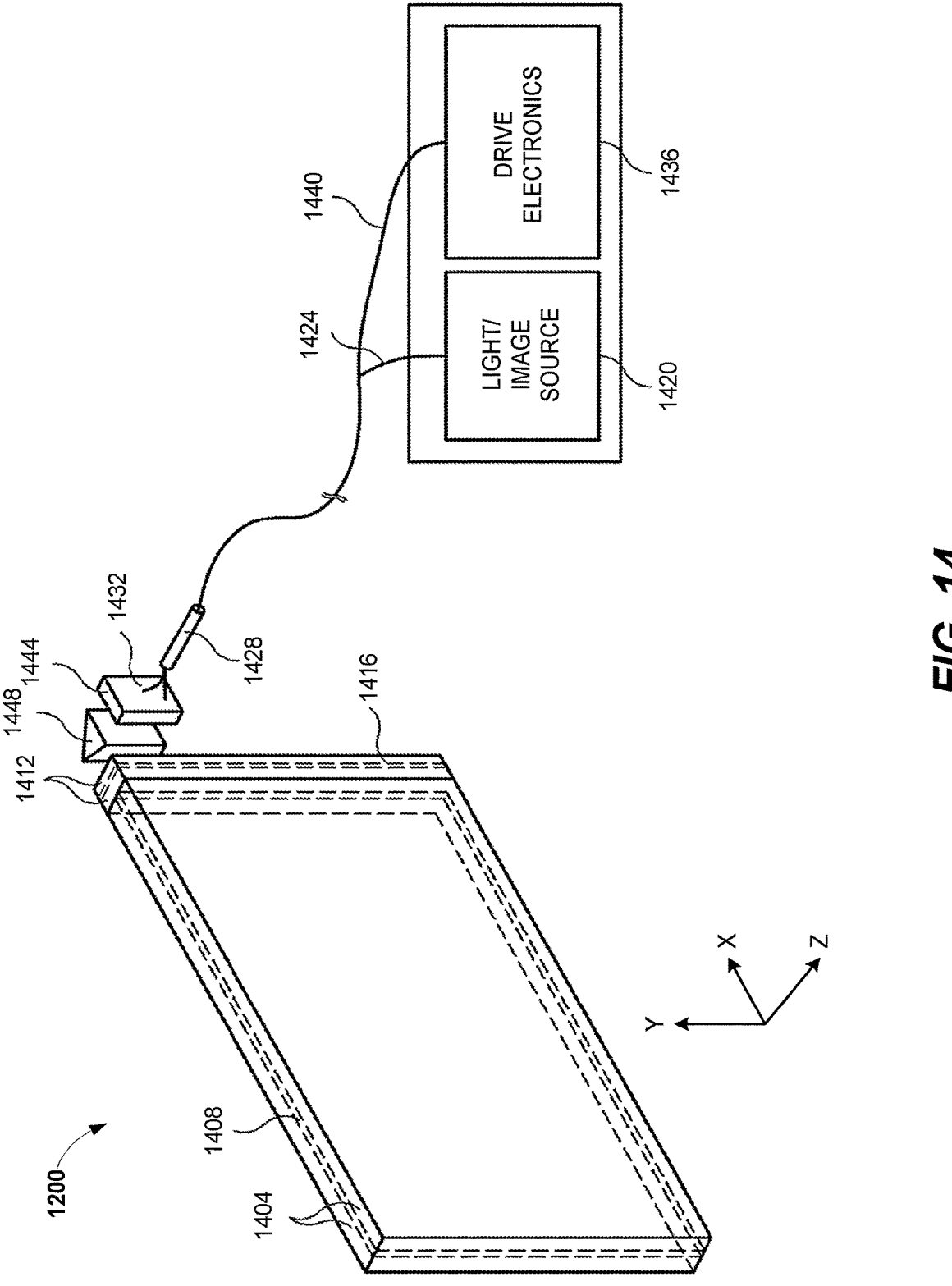
FIG. 14 is a schematic diagram showing a display system, according to one embodiment.

FIG. 14 shows another example of the display system 1200 including a waveguide apparatus, an optical coupler subsystem to optically couple light to or from the waveguide apparatus, and a control subsystem. The display system 1200 can be used to generate a multi-focal volumetric, image, or light field. The display system 1200 can include one or more primary planar waveguides 1404 (only one is shown in FIG. 14) and one or more DOEs 1408 associated with each of at least some of the primary waveguides 1404. The planar waveguides 1404 can be similar to the waveguides 1220, 1222, 1224, 1226, 1228 discussed with reference to FIG. 12. The optical system may employ a distribution waveguide apparatus, to relay light along a first axis (vertical or Y-axis in view of FIG. 14), and expand the light's effective exit pupil along the first axis (e.g., Y-axis). The distribution waveguide apparatus, may, for example include a distribution planar waveguide 1412 and at least one DOE 1416 (illustrated by double dash-dot line) associated with the distribution planar waveguide 1412. The distribution planar waveguide 1412 may be similar or identical in at least some respects to the primary planar waveguide 1404, having a different orientation therefrom. Likewise, the at least one DOE 1416 may be similar or identical in at least some respects to the DOE 1408. For example, the distribution planar waveguide 1412 and/or DOE 1416 may be comprised of the same materials as the primary planar waveguide 1404 and/or DOE 1408, respectively. The optical system shown in FIG. 14 can be integrated into the wearable display system 1000 shown in FIG. 10.

The relayed and exit-pupil expanded light is optically coupled from the distribution waveguide apparatus into the one or more primary planar waveguides 1404. The primary planar waveguide 1404 relays light along a second axis, preferably orthogonal to first axis, (e.g., horizontal or X-axis in view of FIG. 14). Notably, the second axis can be a non-orthogonal axis to the first axis. The primary planar waveguide 1404 expands the light's effective exit path along that second axis (e.g., X-axis). For example, the distribution planar waveguide 1412 can relay and expand light along the vertical or Y-axis, and pass that light to the primary planar waveguide 1404 which relays and expands light along the horizontal or X-axis.

The display system 1200 may include one or more sources of colored light (e.g., red, green, and blue laser light) 1420 which may be optically coupled into a proximal end of a single mode optical fiber 1424. A distal end of the optical fiber 1424 may be threaded or received through a hollow tube 1428 of piezoelectric material. The distal end protrudes from the tube 1428 as fixed-free flexible cantilever 1432. The piezoelectric tube 1428 can be associated with four quadrant electrodes (not illustrated). The electrodes may, for example, be plated on the outside, outer surface or outer periphery or diameter of the tube 1428. A core electrode (not illustrated) is also located in a core, center, inner periphery or inner diameter of the tube 1428.

Drive electronics 1436, for example electrically coupled via wires 1440, drive opposing pairs of electrodes to bend the piezoelectric tube 1428 in two axes independently. The protruding distal tip of the optical fiber 1424 has mechanical modes of resonance. The frequencies of resonance can depend upon a diameter, length, and material properties of the optical fiber 1424. By vibrating the piezoelectric tube 1428 near a first mode of mechanical resonance of the fiber cantilever 1432, the fiber cantilever 1432 is caused to vibrate, and can sweep through large deflections.

By stimulating resonant vibration in two axes, the tip of the fiber cantilever 1432 is scanned biaxially in an area filling two dimensional (2-D) scan. By modulating an intensity of light source(s) 1420 in synchrony with the scan of the fiber cantilever 1432, light emerging from the fiber cantilever 1432 forms an image. Descriptions of such a set up are provided in U.S. Patent Publication No. 2014/0003762, which is incorporated by reference herein in its entirety.

A component 1444 of an optical coupler subsystem collimates the light emerging from the scanning fiber cantilever 1432. The collimated light is reflected by mirrored surface 1448 into the narrow distribution planar waveguide 1412 which contains the at least one diffractive optical element (DOE) 1416. The collimated light propagates vertically (relative to the view of FIG. 14) along the distribution planar waveguide 1412 by total internal reflection, and in doing so repeatedly intersects with the DOE 1416. The DOE 1416 preferably has a low diffraction efficiency. This causes a fraction (e.g., 10%) of the light to be diffracted toward an edge of the larger primary planar waveguide 1404 at each point of intersection with the DOE 1416, and a fraction of the light to continue on its original trajectory down the length of the distribution planar waveguide 1412 via TIR.

At each point of intersection with the DOE 1416, additional light is diffracted toward the entrance of the primary waveguide 1412. By dividing the incoming light into multiple outcoupled sets, the exit pupil of the light is expanded vertically by the DOE 1416 in the distribution planar waveguide 1412. This vertically expanded light coupled out of distribution planar waveguide 1412 enters the edge of the primary planar waveguide 1404.

Light entering primary waveguide 1404 propagates horizontally (relative to the view of FIG. 14) along the primary waveguide 1404 via TIR. As the light intersects with DOE 1408 at multiple points as it propagates horizontally along at least a portion of the length of the primary waveguide 1404 via TIR. The DOE 1408 may advantageously be designed or configured to have a phase profile that is a summation of a linear diffraction pattern and a radially symmetric diffractive pattern, to produce both deflection and focusing of the light. The DOE 1408 may advantageously have a low diffraction efficiency (e.g., 10%), so that only a portion of the light of the beam is deflected toward the eye of the view with each intersection of the DOE 1408 while the rest of the light continues to propagate through the waveguide 1404 via TIR.

At each point of intersection between the propagating light and the DOE 1408, a fraction of the light is diffracted toward the adjacent face of the primary waveguide 1404 allowing the light to escape the TIR, and emerge from the face of the primary waveguide 1404. In some embodiments, the radially symmetric diffraction pattern of the DOE 1408 additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 1404 by a multiplicity of DOEs 1408 at different angles, focus levels, and/or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Additional Aspects

In a 1st aspect, a head mounted display system is disclosed. The head mounted display system comprises: non-transitory computer-readable storage medium storing executable instructions; and a processor in communication with the non-transitory computer-readable storage medium, the processor programmed by the executable instructions to: receive a first communication comprising a first data object from a first device, wherein the first communication is generated based at least partly on first shared data, wherein the first device is configured to send the first shared data to a third device; receive a second communication comprising a second data object from a second device, wherein the second communication is generated based at least partly on second shared data, wherein the second device is configured to send the second shared data to the third device; transmit the first data object and the second data object to the third device, wherein the third device is configured to authenticate the head mounted display system, the first device, and the second device based at least partly on the first shared data from the first device, the second shared data from the second device, the first data object from the head mounted display system, and the second data object from the head mounted display system; and receive a third communication comprising a third data object from the third device, wherein the third data object indicates the third device has successfully authenticated the head mounted display system, the first device, and the second device.

In a 2nd aspect, the head mounted display system of aspect 1, wherein the third device is in communication with the head mounted display system, the first device, and the second device over a cloud.

In a 3rd aspect, the head mounted display system of any one of aspects 1-2, wherein the processor is further programmed by the executable instructions to transmit an identifier of the head mounted display system to the third device.

In a 4th aspect, the head mounted display system of aspect 3, wherein the third device authenticates the head mounted display system, the first device, and the second device based at least partly on the identifier of the head mounted display system.

In a 5th aspect, the head mounted display system of any one of aspects 3-4, wherein the third data object comprises an encryption key.

In a 6th aspect, the head mounted display system of any one of aspects 1-5, wherein the first communication is generated by the first device.

In a 7th aspect, the head mounted display system of any one of aspects 1-6, wherein the second communication is generated by the second device.

In an 8th aspect, the head mounted display system of any one of aspects 1-7, wherein to authenticate the head mounted display system, the first device, the second device, and the third device is configured to: generate the first data object based on the first shared data; verify consistency of the first data object generated by the third device and the first data object from the head mounted display system; generate the second data object based on the second shared data; and verify consistency of the second data object generated by the third device and the second data object from the head mounted display system.

In a 9th aspect, the head mounted display system of any one of aspects 1-8, wherein the first communication is generated by the first device based at least partly on first data, wherein the first data is generated by the third device based at least partly on the first shared data.

In a 10th aspect, the head mounted display system of aspect 9, wherein the second communication is generated by the second device based at least partly on second data, wherein the second data is generated by the third device based at least partly on the second shared data.

In an 11th aspect, the head mounted display system of aspect 10, wherein to authenticate the head mounted display system, the first device, and the second device, the third device is configured to: generate the first data object based on the first data; verify consistency of the first data object generated by the third device and the first data object from the head mounted display system; generate the second data object based on the second data; and verify consistency of the second data object generated by the third device and the second data object from the head mounted display system.

In a 12th aspect, the head mounted display system of any one of aspects 1-11, wherein the first shared data comprises an identifier of the first device, and wherein the second shared data comprises an identifier of the second device.

In a 13th aspect, the head mounted display system of aspect 12, wherein the identifier of the first device comprises an address of the first device, and wherein the identifier of the second device comprises an address of the second device.

In a 14th aspect, the head mounted display system of aspect 13, wherein at least one of the address of the first device and the address of the second device comprises an Internet Protocol (IP) address of the first device, a media access control (MAC) address of the first device, or a combination thereof.

In a 15th aspect, the head mounted display system of any one of aspects 12-14, wherein the identifier of the first device uniquely identifies the first device, and wherein the identifier of the second device uniquely identifies the second device.

In a 16th aspect, the head mounted display system of any one of aspects 1-15, wherein at least one of the first shared data and the second shared data comprises a spoken phrase.

In a 17th aspect, the head mounted display system of aspect 16, wherein the spoken phrase comprises an alpha-numeric phrase.

In a 18th aspect, the head mounted display system of any one of aspects 1-17, wherein at least one of the first shared data and the second shared data comprises one or more spectral qualities of a spoken phrase.

In a 19th aspect, the head mounted display system of any one of aspects 1-18, wherein at least one of the first shared data and the second shared data comprises biometric data of a user.

In a 20th aspect, the head mounted display system of any one of aspects 1-19, wherein at least one of the first communication and the second communication comprises an optical communication.

In a 21st aspect, the head mounted display system of aspect 20, wherein the optical communication comprises a one-dimensional pattern, a two-dimensional optical pattern, or a combination thereof.

In a 22nd aspect, the head mounted display system of any one of aspects 1-21, wherein at least one of the first communication and the second communication comprises an audio communication.

In a 23rd aspect, the head mounted display system of aspect 22, wherein the audio communication is inaudible to human ears.

In a 24th aspect, the head mounted display system of aspect 22, wherein the audio communication is ultrasonic.

In a 25th aspect, the head mounted display system of any one of aspects 1-24, wherein at least one of the first communication, the second communication, and the third communication is received via a wireless communication channel.

In a 26th aspect, the head mounted display system of aspect 25, wherein the wireless communication channel comprises a Wi-Fi communication channel, a near field communication (NFC) channel, or a combination thereof.

In a 27th aspect, the head mounted display system of any one of aspects 1-26, wherein the first device or the second device comprises at least one of another head mounted display system, a head mounted display system, a totem, a cellphone, a tablet computer, a mobile device, or any combination thereof.

In a 28th aspect, the head mounted display system of any one of aspects 1-27, wherein the first device and the second device are connected to the third device through an access point.

In a 29th aspect, the head mounted display system of any one of aspects 1-28, wherein the first device, the second device, and the head mounted display system are connected to the third device through an access point.

In a 30th aspect, the head mounted display system of any one of aspects 1-29, wherein the processor is further programmed by the executable instructions to: notify a user of the head mounted display system that the third device has successfully authenticated the head mounted display.

In a 31st aspect, the head mounted display system of aspect 30, wherein to notify the user of the head mounted display system, the processor is programmed to: notify the user of the head mounted display system, using the display, that the third device has successfully authenticated the head mounted display.

In a 32nd aspect, the head mounted display system of any one of aspects 30-31, wherein to notify the user of the head mounted display system, the processor is programmed to: cause the display to modify a user interface shown to the user to notify the user of the head mounted display system that the third device has successfully authenticated the head mounted display.

In a 33rd aspect, the head mounted display system of any one of aspects 30-32, wherein to notify the user of the head mounted display, the processor is programmed to: notify the user of the head mounted display, using a speaker of the head mounted display system, that the third device has successfully authenticated the head mounted display.

In a 34th aspect, a wearable display system is disclosed. The wearable display system comprises: a display; an image capture device configured to capture images of a companion device; non-transitory computer-readable storage medium configured to store the images of the companion device and executable instructions; and a processor in communication with the image capture device and the non-transitory computer-readable storage medium, the processor programmed by the executable instructions to: receive a first image of a first optical pattern displayed by the companion device captured by the image capture device, wherein the first optical pattern is generated by the companion device based on first shared data; extract first data from the first optical pattern in the received first image; and authenticate the companion device based on the first data extracted from the first optical pattern.

In a 35th aspect, the wearable display system of aspect 34, wherein the processor is further programmed to: generate the first shared data; and transmit the first shared data to the companion device via a first communication channel.

In a 36th aspect, the wearable display system of any one of aspects 34-35, wherein to authenticate the companion device, the processor is programmed to: verify consistency of the first data and the first shared data.

In a 37th aspect, the wearable display system of any one of aspects 34-36, wherein the processor is further programmed to: receive a second image of a second optical pattern displayed by the companion device captured by the image capture device, wherein the second optical pattern is generated by the companion device based on second shared data, and wherein the second shared data is generated by the companion device; extract second data from the second optical pattern in the received second image; and transmit the second data to the companion device via a first communication channel.

In a 38th aspect, the wearable display system of aspect 37, wherein the companion device is programmed to: receive the second data from the wearable display system; and authenticate the wearable display system based on the received second data.

In a 39th aspect, the wearable display system of aspect 38, wherein to authenticate the wearable display system, the companion device is programmed to: verify consistency of the second data received and the second shared data.

In a 40th aspect, the wearable display system of any one of aspects 34-39, wherein the first shared data is generated by the companion device.

In a 41st aspect, the wearable display system of any one of aspects 34-40, wherein the processor is further programmed to: receive a public key of the companion device; receive an encrypted public key of the companion device via a first communication channel, wherein the encrypted public key of the companion device is encrypted by the companion device using the first shared data; and decrypt, using the first shared data, the encrypted public key of the companion device to obtain a decrypted public key.

In a 42nd aspect, the wearable display system of aspect 41, wherein to authenticate the companion device, the processor is programmed to: verify consistency of the decrypted public key and the public key of the companion device.

In a 43rd aspect, the wearable display system of any one of aspects 34-42, wherein the first communication channel is a wireless communication channel.

In a 44th aspect, the wearable display system of aspect 43, wherein the wireless communication channel comprises a Wi-Fi communication channel or a near field communication (NFC) channel.

In a 45th aspect, the wearable display system of any one of aspects 34-44, wherein the companion device comprises at least one of another wearable display system, a head mounted display system, a totem, a cellphone, a tablet computer, a mobile device, or any combination thereof.

In a 46th aspect, the wearable display system of any one of aspects 34-45, wherein the processor is further programmed by the executable instructions to: notify a user of the wearable display system that the companion device is authenticated.

In a 47th aspect, the wearable display system of aspect 46, wherein to notify the user of the wearable display system, the processor is programmed to: notify the user of the wearable display system, using the display, that the companion device is authenticated.

In a 48th aspect, the wearable display system of any one of aspects 46-47, wherein to notify the user of the wearable display system, the processor is programmed to: cause the display to modify a user interface shown to the user to notify the user of the wearable display system that the companion device is authenticated.

In a 49th aspect, the wearable display system of any one of aspects 46-48, wherein to notify the user of the wearable display system, the processor is programmed to notify the user of the wearable display system, using a speaker of the wearable display system, that the companion device is authenticated.

In a 50th aspect, a method for device authentication is disclosed. The method is under control of a hardware processor and comprises: receiving a data object via a communication channel; receiving an image of an optical pattern displayed by a companion device, wherein the optical pattern is generated by the companion device using shared data; extracting first data from the optical pattern in the received image; generating a transformation of the data object using the first data; and transmitting the transformation of the data object via the communication channel to the companion device for authentication.

In a 51st aspect, the method of aspect 50, wherein the data object comprises a challenge text.

In a 52nd aspect, the method of any one of aspects 50-51, wherein the transformation of the data object comprises a hash of the data object generated using the first data.

In a 53rd aspect, the method of any one of aspects 50-52, wherein the transformation of the data object comprises an encrypted data object generated using the first data.

In a 54th aspect, the method of any one of aspects 50-53, wherein the first data comprises the shared data.

In a 55th aspect, the method of any one of aspects 50-54, wherein the companion device, for authentication, is configured to: generate a transformation of the data object using the shared data; receive the transformation of the data object; and verify consistency of the received transformation of the data object and the generated transformation of the data object.

In a 56th aspect, a head mounted display system is disclosed. The head mounted display system comprises: a display; non-transitory computer-readable storage medium storing executable instructions; and a processor in communication with the non-transitory computer-readable storage medium, the processor programmed by the executable instructions to: receive a first communication from a device, wherein the first communication is generated by the device based on first shared information; extract first information from the first communication; and authenticate the device based on the first information extracted from the first communication.

In a 57th aspect, the head mounted display system of aspect 56, wherein the first communication comprises an optical communication.

In a 58th aspect, the head mounted display system of aspect 57, wherein the optical communication comprises a one-dimensional pattern, a two-dimensional optical pattern, or a combination thereof.

In a 59th aspect, the head mounted display system of any one of aspects 56-58, wherein the first communication comprises an audio communication.

In a 60th aspect, the head mounted display system of aspect 59, wherein the audio communication is inaudible to human ears.

In a 61st aspect, the head mounted display system of aspect 59, wherein the audio communication is ultrasonic.

In a 62nd aspect, the head mounted display system of any one of aspects 56-61, wherein the first shared information comprises a spoken phrase.

In a 63rd aspect, the head mounted display system of aspect 62, further comprising a microphone configured to capture the spoken phrase, and wherein the processor is further programmed to: receive the spoken phrase.

In a 64th aspect, the head mounted display system of aspect 63, wherein a microphone of the device is configured to receive the spoken phrase.

In a 65th aspect, the head mounted display system of any one of aspects 62-64, wherein the spoken phrase comprises an alphanumeric phrase.

In a 66th aspect, the head mounted display system of any one of aspects 56-65, wherein the first shared information comprises one or more spectral qualities of a spoken phrase.

In a 67th aspect, the head mounted display system of any one of aspects 56-66, wherein the first shared information comprises biometric information of a user.

In a 68th aspect, the head mounted display system of aspect 67, wherein the processor is further programmed to: extract the biometric information of the user.

In a 69th aspect, the head mounted display system of any one of aspects 56-68, wherein the processor is further programmed to: generate the first shared information; and transmit the first shared information to the device via a first communication channel.

In a 70th aspect, the head mounted display system of any one of aspects 56-69, wherein to authenticate the device, the processor is programmed to: verify consistency of the first information and the first shared information.

In a 71 st aspect, the head mounted display system of any one of aspects 56-70, wherein the processor is further programmed to: receive a second communication from the device, wherein the second communication is generated by the device based on second shared information, and wherein the second shared information is generated by the device; extract second information from the received second communication; and transmit the second shared information to the device via a first communication channel.

In a 72nd aspect, the head mounted display system of aspect 71, wherein the device is programmed to: receive the second information from the head mounted display system; and authenticate the head mounted display system based on the received second information.

In a 73rd aspect, the head mounted display system of aspect 72, wherein to authenticate the head mounted display system, the device is programmed to: verify consistency of the second information received and the second shared information generated.

In a 74th aspect, the head mounted display system of any one of aspects 56-73, wherein the first shared information is generated by the device.

In a 75th aspect, the head mounted display system of any one of aspects 56-74, wherein the processor is further programmed to: receive a public key of the device; receive an encrypted public key of the device via a first communication channel, wherein the encrypted public key of the device is encrypted by the device using the first shared information; and decrypt, using the first shared information, the encrypted public key of the device to obtain a decrypted public key.

In a 76th aspect, the head mounted display system of aspect 75, wherein to authenticate the device, the processor is programmed to: verify consistency of the decrypted public key and the public key of the device.

In a 77th aspect, the head mounted display system of any one of aspects 56-76, wherein the first communication channel is a wireless communication channel.

In a 78th aspect, the head mounted display system of aspect 77, wherein the wireless communication channel comprises a Wi-Fi communication channel, a near field communication (NFC) channel, or a combination thereof.

In a 79th aspect, the head mounted display system of any one of aspects 56-78, wherein the device comprises at least one of another head mounted display system, a head mounted display system, a totem, a cellphone, a tablet computer, a mobile device, or any combination thereof.

In a 80th aspect, the head mounted display system of any one of aspects 56-79, wherein the processor is further programmed to notify a user of the head mounted display system that the device is authenticated In a 81st aspect, the head mounted display system of aspect 80, wherein to notify the user of the head mounted display system, the processor is programmed to notify the user of the head mounted display system, using the display, that the device is authenticated.

In a 82nd aspect, the head mounted display system of any one of aspects 80-81, wherein to notify the user of the head mounted display system, the processor is programmed to: cause the display to modify a user interface shown to the user to notify the user of the head mounted display system that the device is authenticated.

In a 83rd aspect, the head mounted display system of any one of aspects 80-82, wherein to notify the user of the head mounted display system, the processor is programmed to notify the user of the head mounted display system, using a speaker of the head mounted display system, that the companion device is authenticated.

CONCLUSION

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described herein may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A display system comprising:

a head mountable display;

memory storing executable instructions; and one or more processors in communication with the memory and the display, the one or more processors programmed by the executable instructions to perform operations comprising:

receiving a request to authenticate a connection between the display system and a companion device;

responsive to receiving the request to form the connection, determining first data to be used in authenticating the connection between the display system and the companion device, wherein the first data is based at least partly on biometric data that is associated with a user of the display system;

transmitting the first data to an authentication device that is configured to authenticate the connection based at least in part on comparing the first data to second data that is received by the authentication device from the companion device, the second data based at least partly on the biometric data;

receiving, from the authentication device, a confirmation of a successful authentication of the connection, wherein the successful authentication is determined by the authentication device based at least partly on determining a match between the first data and the second data; and in response to receiving the confirmation of successful authentication of the connection, permitting bi-directional communication of data between the companion device and the display system using the connection, and presenting, through the display, a notification to the user of the display system that the connection has been authenticated.

2. The display system of claim 1, wherein the biometric data is associated with an eye of the user.

3. The display system of claim 2, further comprising at least one image capture device, and wherein determining the first data includes:

receiving at least one image of the eye of the user captured by the at least one image capture device; and determining the biometric data based on the at least one image of the eye; and generating the first data based at least partly on the biometric data.

4. The display system of claim 1, wherein the biometric data is an iris code of an eye of the user.

5. The display system of claim 1, wherein the request to form the connection between the display system and the companion device is received from the companion device.

6. The display system of claim 5, wherein the request to form the connection between the display system and the companion device is received from the companion device through an out-of-band communication.

7. The display system of claim 5, wherein the request includes the first data that is generated by the companion device based at least partly on the biometric data, and wherein determining the first data includes extracting the first data from the request.

8. The display system of claim 5, wherein the companion device is configured to determine the biometric data and generate the first data based on the biometric data, and wherein the companion device is further configured to generate the second data based on the biometric data and communicate the second data to the authentication device.

9. The display system of claim 8, wherein the biometric data is associated with an eye of the user, wherein the companion device includes at least one image capture device configured to capture at least one image of the eye of the user, and wherein the companion device is further configured to determine the biometric data based on the at least one image of the eye, generate the second data based on the biometric data, and communicate the second data to the authentication device.

10. The display system of claim 1, wherein the companion device is configured to receive user input from the user and, based on the user input, use the connection to provide commands to control the display system.

11. The display system of claim 1, wherein the companion device is a portable computing device.

12. A method for authenticating a connection between a companion device and a display system that includes a head mountable display, the method performed by the display system and comprising:

receiving a request to authenticate a connection between the display system and a companion device;

responsive to receiving the request to form the connection, determining first data to be used in authenticating the connection between the display system and the companion device, wherein the first data is based at least partly on biometric data that is associated with a user of the display system;

transmitting the first data to an authentication device that is configured to authenticate the connection based at least in part on comparing the first data to second data that is received by the authentication device from the companion device, the second data based at least partly on the biometric data;

receiving, from the authentication device, a confirmation of a successful authentication of the connection, wherein the successful authentication is determined by the authentication device based at least partly on determining a match between the first data and the second data; and in response to receiving the confirmation of successful authentication of the connection, permitting bi-directional communication of data between the companion device and the display system using the connection, and presenting, through the display, a notification to the user of the display system that the connection has been authenticated.

13. The method of claim 12, wherein the biometric data is associated with an eye of the user.

14. The method of claim 13, further comprising at least one image capture device, and wherein determining the first data includes:

receiving at least one image of the eye of the user captured by the at least one image capture device; and determining the biometric data based on the at least one image of the eye; and generating the first data based at least partly on the biometric data.

15. The method of claim 12, wherein the biometric data is an iris code of an eye of the user.

16. The method of claim 12, wherein the request to form the connection between the display system and the companion device is received from the companion device.

17. The method of claim 16, wherein the request to form the connection between the display system and the companion device is received from the companion device through an out-of-band communication.

18. The method of claim 16, wherein the request includes the first data that is generated by the companion device based at least partly on the biometric data, and wherein determining the first data includes extracting the first data from the request.

19. The method of claim 16, wherein the companion device is configured to determine the biometric data and generate the first data based on the biometric data, and wherein the companion device is further configured to generate the second data based on the biometric data and communicate the second data to the authentication device.

20. The method of claim 19, wherein the biometric data is associated with an eye of the user, wherein the companion device includes at least one image capture device configured to capture at least one image of the eye of the user, and wherein the companion device is further configured to determine the biometric data based on the at least one image of the eye, generate the second data based on the biometric data, and communicate the second data to the authentication device.

* * * * *